US011304257B2

(12) United States Patent
Tie et al.

(10) Patent No.: US 11,304,257 B2
(45) Date of Patent: Apr. 12, 2022

(54) INDICATION SIGNAL CONFIGURATION METHOD AND DEVICE

(71) Applicant: Huawei Technologies Co., Ltd., Shenzhen (CN)

(72) Inventors: Xiaolei Tie, Shanghai (CN); Tong Ji, Beijing (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 16/875,323

(22) Filed: May 15, 2020

(65) Prior Publication Data

US 2020/0281042 A1 Sep. 3, 2020

Related U.S. Application Data

(63) Continuation of application No. PCT/CN2017/111761, filed on Nov. 17, 2017.

(51) Int. Cl.
*H04W 76/28* (2018.01)
*H04W 52/02* (2009.01)
*H04W 28/06* (2009.01)

(52) U.S. Cl.
CPC ....... *H04W 76/28* (2018.02); *H04W 52/0216* (2013.01); *H04W 52/0235* (2013.01); *H04W 28/06* (2013.01)

(58) Field of Classification Search
CPC ............. H04W 76/28; H04W 52/0216; H04W 52/0235; H04W 28/06; H04W 68/025; H04W 74/04; Y02D 30/70
See application file for complete search history.

(56) References Cited

U.S. PATENT DOCUMENTS 8,400,998 B2 3/2013 Kuchibhotla et al.
2016/0095125 A1 3/2016 Park et al.
(Continued)

FOREIGN PATENT DOCUMENTS

CN 101529837 A 9/2009
CN 105474684 A 4/2016
(Continued)

OTHER PUBLICATIONS

3GPP TSG RAN WG1 Meeting #90; R1-1712504, Source: Intel Corporation, Title: Design of synchronization signals and system information for TDD support in feNB-IoT, Prague, Czech Republic, Aug. 21-25, 2017. (Year: 2017).*
(Continued)

*Primary Examiner* — Hassan A Phillips
*Assistant Examiner* — Mohammed S Chowdhury
(74) *Attorney, Agent, or Firm* — Slater Matsil, LLP

(57) ABSTRACT

An indication signal configuration method and device are provided, and relate to the field of communications technologies. The method includes: sending, by a network device, first configuration information and second configuration information; sending a first indication signal on a first carrier; and sending a second indication signal on a second carrier, where the first configuration information is used to indicate duration of the first indication signal corresponding to the first carrier, the second configuration information is used to indicate duration of the second indication signal corresponding to the second carrier, the first terminal device is a terminal device that needs to receive the first indication signal, and the second terminal device is a terminal device that needs to receive the second indication signal.

16 Claims, 11 Drawing Sheets

(56) References Cited

U.S. PATENT DOCUMENTS

| | | | | |
|---|---|---|---|---|
| 2016/0183241 | A1 | 6/2016 | Lee et al. | |
| 2019/0103950 | A1* | 4/2019 | Liu | H04W 4/06 |
| 2019/0246371 | A1* | 8/2019 | Hwang | H04W 72/0453 |
| 2020/0169956 | A1* | 5/2020 | Sun | H04L 12/2803 |
| 2020/0196242 | A1* | 6/2020 | Hoglund | H04W 52/0229 |
| 2020/0229095 | A1* | 7/2020 | Shrestha | H04W 52/0235 |
| 2020/0245303 | A1* | 7/2020 | Hwang | H04W 52/0216 |
| 2020/0267670 | A1* | 8/2020 | Strom | H04W 48/10 |
| 2021/0076445 | A1* | 3/2021 | Tsai | H04W 76/19 |
| 2021/0136687 | A1* | 5/2021 | Liu | H04W 72/0446 |

FOREIGN PATENT DOCUMENTS

| | | | |
|---|---|---|---|
| CN | 106664675 | A | 5/2017 |
| CN | 107211478 | A | 9/2017 |
| EP | 3190843 | A1 | 7/2017 |
| JP | 2015177284 | A | 10/2015 |
| RU | 2438260 | C2 | 12/2011 |
| WO | 2016190798 | A2 | 12/2016 |
| WO | 2017167839 | A1 | 10/2017 |

OTHER PUBLICATIONS

3GPP TSG RAN WG1 Meeting #90bis ; R1-1718141; Source: Qualcomm Incorporated; Title: Wake-up signal configurations and procedures, Prague, Czechia, Oct. 9-13, 2017 (Year: 2017).*

3GPP TS 36.211 V14.4.0 (Sep. 2017), 3rd Generation Partnership Project; Technical Specification Group Radio Access Network; Evolved Universal Terrestrial Radio Access (E-UTRA); Physical channels and modulation (Release 14), 197 pages.

Qualcomm Incorporated: “Wake-up signal configurations and procedures”, 3GPP TSG RAN WG1 Meeting #90bis; R1-1718141, Oct. 9-13, 2017, 7 pages, Prague, Czechia.

Huawei et al: “On “wake-up signal” for paging and connectedmode DRX”, 3GPP TSG RAN WG1 Meeting #89; R1-1707021, May 15-19, 2017, 9 pages, Hangzhou, China.

Qualcomm Incorporated: “Efficient monitoring of DL control channels”, 3GPP TSG RAN WG1 Meeting #89; R1-1708802, May 15-19, 2017, 10 pages, Hangzhou, China.

3GPP TS 36.213 V14.4.0 (Sep. 2017), 3rd Generation Partnership Project; Technical Specification Group Radio Access Network; Evolved Universal Terrestrial Radio Access (E-UTRA); Physical layer procedures (Release 14), 462 pages.

3GPP TS 36.331 V14.4.0 (Sep. 2017), 3rd Generation Partnership Project;Technical Specification Group Radio Access Network; Evolved Universal Terrestrial Radio Access (E-UTRA); Radio Resource Control (RRC); Protocol specification (Release 14), 753 pages.

3GPP TS 36.304 V14.4.0 (Sep. 2017), 3rd Generation Partnership Project; Technical Specification Group Radio Access Network; Evolved Universal Terrestrial Radio Access (E-UTRA); User Equipment (UE) procedures in idle mode (Release 14), Sep. 2017, 49 pages.

LG Electronics et al., “Discussion on power saving signal/channel configurations and procedures”, 3GPP TSG RAN WG1 Meeting 90bis, R1-1717273, Oct. 9-13, 2017, 5 pages, Prague, CZ.

Intel Corporation et al., “Wake-up signal for efeMTC”, 3GPP TSG RAN WG1 Meeting #90, R1-1712498, Aug. 21-25, 2017, 8 pages, Prague, Czech Republic.

Ericsson et al., “NB-IoT Paging on non-anchor PRBs”, 3GPP TSG-RAN WG1 #87, R1-1611124, Nov. 14 18, 2016, 3 pages,Reno, Nevada, USA.

* cited by examiner

Anchor PRB
Anchor PRB

Non-anchor PRB
Non-anchor PRB

Receive no WUS

INDICATION SIGNAL CONFIGURATION METHOD AND DEVICE

CROSS-REFERENCE TO RELATED APPLICATIONS

This application is a continuation of International Application No. PCT/CN2017/111761, filed on Nov. 17, 2017, the disclosure of which is hereby incorporated by reference in its entirety.

TECHNICAL FIELD

This application relates to the field of communications technologies, and in particular, to an indication signal configuration method and device.

BACKGROUND

An indication signal is introduced into a narrow band internet of things (NB-IoT) system and a new radio (NR) system. The indication signal is used to indicate whether a terminal device needs to continue to receive a signal associated with the indication information or process a channel associated with the indication signal. The signal associated with the indication information is downlink control information (DCI) sent by a network device on a physical downlink control channel (PDCCH). The channel associated with the indication information is the PDCCH. Without loss of generality, the signal associated with the indication signal is any signal sent by the network device, the channel associated with the indication signal is any channel that carries the any signal, and the indication signal is sent before the network device sends the signal associated with the indication signal.

As shown in FIG. 1, the indication signal is associated with a PDCCH channel in a target search space. If the terminal device receives the indication signal, the terminal device further performs blind detection in the associated target search space, to receive DCI sent by the network device on the PDCCH; and the terminal device may receive, based on the received DCI, downlink data sent by the network device on a physical downlink shared channel (PDSCH), or send uplink data to the network device on a physical uplink shared channel (PUSCH). If the terminal device does not receive the indication signal or the indication signal instructs the terminal device not to process a PDCCH channel in a subsequent search space, the terminal device directly skips the target search space associated with the indication signal without performing blind detection. However, when the indication signal is not introduced, even if there is no PDSCH scheduling or PUSCH sending, to be specific, there is no PDCCH in a search space, the terminal device still needs to perform blind detection in the target search space. Blind detection in the target search space refers to a process of demodulating and decoding a PDCCH. A decoding process is a process of blind decoding, to be specific, the decoding process is a process in which blind decoding is performed on several candidates. Such a process is comparatively time-consuming and the terminal device consumes comparatively large power. Therefore, the terminal device consumes comparatively large power.

After the indication signal is introduced, because the indication signal is designed to carry only quite limited information, power consumption required for receiving the indication signal is comparatively low. When receiving the indication signal, the terminal device does not perform blind detection. Therefore, power consumption of the terminal device can be reduced.

In an application example of the indication signal, when the terminal device is in an idle mode, the terminal device needs to periodically wake up to check whether there is a paging message. In this case, the terminal device may determine, by using the indication signal, whether to process a PDCCH starting from each paging occasion. In addition, in this example, the terminal device may further use the indication signal to synchronize with the network device, so that the terminal device does not need to use a primary synchronization signal (PSS) and a secondary synchronization signal (SSS) to synchronize with the network device. This further reduces power consumption of the terminal device.

However, when the terminal device uses the indication signal to synchronize with the network device, to enable the indication signal to meet a detection requirement of the terminal device in target coverage of a cell, comparatively high overheads of the indication signal may be caused. Therefore, to ensure that the indication signal implements the foregoing two functions, the indication signal needs to be optimized in design.

SUMMARY

This application provides an indication signal configuration method and device, to flexibly adjust a coverage area of an indication signal and control overheads of the indication signal.

According to a first aspect, an embodiment of this application provides an indication signal configuration method, including: sending, by a network device, first configuration information and second configuration information, sending a first indication signal on a first carrier, and sending a second indication signal on a second carrier, where the first configuration information is used to indicate duration of the first indication signal corresponding to the first carrier, the second configuration information is used to indicate duration of the second indication signal corresponding to the second carrier, the first indication signal is used to indicate whether a first terminal device continues to receive a signal associated with the first indication signal or process a channel associated with the first indication signal, the second indication information is used to indicate whether a second terminal device continues to receive a signal associated with the second indication signal or process a channel associated with the second indication signal, the first terminal device is a terminal device that needs to receive the first indication signal, and the second terminal device is a terminal device that needs to receive the second indication signal.

In comparison with the prior art in which duration of one indication signal is uniformly configured for different carriers, in this embodiment of this application, the network device can flexibly adjust, based on duration of an indication signal corresponding to each carrier configuration, a coverage area corresponding to the indication signal, and can effectively control overheads of the indication signal.

In a possible design, the duration of the first indication signal is different from the duration of the second indication signal.

The network device may separately configure the duration of the first indication signal and the duration of the second indication signal.

In a possible design, the first carrier is an anchor carrier, and the second carrier is a non-anchor carrier; the second carrier is an anchor carrier, and the first carrier is a non-anchor carrier; or both the first carrier and the second carrier are non-anchor carriers.

In a possible design, the first configuration information further indicates a first determining threshold, and the first determining threshold is used to instruct the first terminal device to determine whether to receive the first indication signal on the first carrier; and the second configuration information further indicates a second determining threshold, and the second determining threshold is used to instruct the second terminal device to determine whether to receive the second indication signal on the second carrier.

It can be learned from the foregoing descriptions that when a measurement value of a preset parameter is less than the first determining threshold corresponding to the first carrier, the first terminal device is located outside a target coverage area of the first indication signal, for example, the first terminal device is located in a cell edge area or a poor coverage area. If the first terminal device still determines, by receiving the indication signal, whether the first terminal device needs to continue to receive the signal associated with the indication information or process the channel associated with the indication signal, due to missing detection of the indication signal, there is a high probability that the first terminal device does not receive the associated signal that needs to be received or does not process the associated channel that needs to be processed. This causes data loss, and affects communication between the first terminal device and the network device.

In a possible design, the first configuration information further indicates a third determining threshold, and the second configuration information further indicates a fourth determining threshold. The third determining threshold is used to instruct the first terminal device to determine, in case of receiving the first indication signal on the first carrier, whether to use a synchronization signal to synchronize with the network device. The fourth determining threshold is used to instruct the second terminal device to determine, in case of receiving the second indication signal on the second carrier, whether to use the synchronization signal to synchronize with the network device.

It can be learned from the foregoing descriptions that when the measurement value of the preset parameter is less than the third determining threshold, if the first terminal device still uses the indication signal to synchronize with the network device, this may cause a synchronization failure, and affect communication between the first terminal device and the network device. Therefore, the first terminal device needs to use the synchronization signal (for example, a PSS and an SSS) to synchronize with the network device.

In a possible design, the first configuration information further indicates a fifth determining threshold and a sixth determining threshold, and the fifth determining threshold is less than the sixth determining threshold. The second configuration information further indicates a seventh determining threshold and an eighth determining threshold, and the seventh determining threshold is less than the eighth determining threshold. The fifth determining threshold and the sixth determining threshold are used to instruct the first terminal device to determine whether to receive the first indication signal on the first carrier, and determine, in case of receiving the first indication signal on the first carrier, whether to use a synchronization signal to synchronize with the network device. The seventh determining threshold and the eighth determining threshold are used to instruct the second terminal device to determine whether to receive the second indication signal on the second carrier, and determine, in case of receiving the second indication signal on the second carrier, whether to use the synchronization signal to synchronize with the network device.

According to the foregoing method, the first terminal device can accurately determine, based on the measurement value of the preset parameter, the fifth determining threshold, and the sixth determining threshold, a case in which the indication signal is not received, a case in which the indication signal is received but the indication signal is not used to synchronize with the network device, and a case in which the indication signal is received and the indication signal is used to synchronize with the network device. Therefore, in Manner 3, it can be better ensured that the first terminal device and the network device normally communicate with each other, and ensured that the terminal device always selects a low-power-consumption manner to communicate with the network device.

In a possible design, the network device sends third configuration information, where the third configuration information indicates a ninth determining threshold. The ninth determining threshold is used to instruct the first terminal device to determine whether to receive the first indication signal on the first carrier, and is used to instruct the second terminal device to determine whether to receive the second indication signal on the second carrier.

In a possible design, the network device sends fourth configuration information, where the fourth configuration information indicates a tenth determining threshold. The tenth determining threshold is used to instruct the first terminal device to determine, in case of receiving the first indication signal on the first carrier, whether to use a synchronization signal to synchronize with the network device; and is used to instruct the second terminal device to determine, in case of receiving the second indication signal on the second carrier, whether to use the synchronization signal to synchronize with the network device.

In a possible design, the network device sends fifth configuration information, where the fifth configuration information indicates an eleventh determining threshold and a twelfth determining threshold. The eleventh determining threshold is less than the twelfth determining threshold. The eleventh determining threshold and the twelfth determining threshold are used to instruct the first terminal device to determine whether to receive the first indication signal on the first carrier, and determine, in case of receiving the first indication signal on the first carrier, whether to use a synchronization signal to synchronize with the network device; and are used to instruct the second terminal device to determine whether to receive the second indication signal on the second carrier, and determine, in case of receiving the second indication signal on the second carrier, whether to use the synchronization signal to synchronize with the network device.

Therefore, the network device needs to configure a corresponding determining threshold for each carrier, or may uniformly configure a same determining threshold for different carriers.

According to a second aspect, an embodiment of this application provides an indication signal configuration method, including: receiving, by a first terminal device, first configuration information sent by a network device; receiving a first indication signal on a first carrier; and continuing, by the first terminal device, to receive a signal associated with the first indication signal or processes a channel associated with the first indication signal, or skipping continuing to receive a signal associated with the first indication signal or process a channel associated with the first indication signal, where the first configuration information is used to indicate duration of the first indication signal sent on the first carrier, the duration of the first indication signal is independent of duration of a second indication signal received by a second terminal device on the second carrier, the first indication signal is used to indicate whether the first terminal device continues to receive the signal associated with the first indication signal or process the channel associated with the first indication signal, and the second indication information is used to indicate whether the second terminal device continues to receive a signal associated with the second indication signal or process a channel associated with the second indication signal.

In comparison with the prior art in which duration of one indication signal is uniformly configured for different carriers, in this embodiment of this application, the network device can flexibly adjust, based on duration of an indication signal corresponding to each carrier configuration, a coverage area corresponding to the indication signal, and can effectively control overheads of the indication signal.

In a possible design, the duration of the first indication signal is different from the duration of the second indication signal.

In a possible design, the first configuration information further indicates a first determining threshold; and the method further includes: determining, by the first terminal device, that a measurement value of a preset parameter is greater than or equal to the first determining threshold, and receiving, by the first terminal device, the first indication signal on the first carrier.

In a possible design, the first configuration information further indicates a third determining threshold, and the method further includes: if the first terminal device determines that a measurement value of a preset parameter is less than the third determining threshold, receiving, by the first terminal device, the first indication signal on the first carrier, and using a synchronization signal to synchronize with the network device; or if the first terminal device determines that a measurement value of a preset parameter is greater than or equal to the third determining threshold, receiving, by the first terminal device, the first indication signal on the first carrier, and using the first indication signal to synchronize with the network device.

In a possible design, the first configuration information further indicates a fifth determining threshold and a sixth determining threshold, and the fifth determining threshold is less than the sixth determining threshold; and the method further includes: if the first terminal device determines that a measurement value of a preset parameter is greater than or equal to the fifth determining threshold and less than the sixth determining threshold, receiving, by the first terminal device, the first indication signal on the first carrier, and using a synchronization signal to synchronize with the network device; or if the first terminal device determines that a measurement value of a preset parameter is greater than or equal to the sixth determining threshold, receiving, by the first terminal device, the first indication signal on the first carrier, and using the first indication signal to synchronize with the network device.

In a possible design, the first terminal device receives a reference signal on an anchor carrier, where the anchor carrier is the first carrier or another carrier; and the first terminal device determines a reference signal received power RSRP corresponding to the reference signal as the measurement value of the preset parameter.

According to a third aspect, an embodiment of this application provides an indication signal configuration method, including: sending, by a network device, first configuration information, where the first configuration information indicates a first determining threshold, or a second determining threshold, or the first determining threshold and the second determining threshold; the first determining threshold is used to instruct a first terminal device to determine whether to receive a first indication signal on a first carrier; the second determining threshold is used to instruct the first terminal device to determine, in case of receiving the first indication signal on the first carrier, whether to use a synchronization signal to synchronize with the network device; and the first terminal device is a terminal device that needs to receive the first indication signal.

In this way, the network device can flexibly configure various determining thresholds, so that based on the determining thresholds, the terminal device determines whether to receive the first indication signal on the first carrier or determines, before receiving the first indication signal on the first carrier, whether to use the synchronization signal to synchronize with the network device.

In a possible design, the first determining threshold corresponds to the first carrier, and the second determining threshold corresponds to the first carrier.

In a possible design, the first determining threshold is further used to instruct a second terminal device to determine whether to receive a second indication signal on a second carrier; the second determining threshold is used to instruct the second terminal device to determine, in case of receiving the second indication signal on the second carrier, whether to use the synchronization signal to synchronize with the network device; and the second terminal device is a terminal device that needs to receive the second indication signal.

According to a fourth aspect, an embodiment of this application provides an indication signal configuration method, including: receiving, by a first terminal device, first configuration information, where the first configuration information indicates a first determining threshold, or a second determining threshold, or the first determining threshold and the second determining threshold; the first determining threshold is used to instruct the first terminal device to determine whether to receive a first indication signal on a first carrier; the second determining threshold is used to instruct the first terminal device to determine, in case of receiving the first indication signal on the first carrier, whether to use a synchronization signal to synchronize with a network device; the first indication signal is used to indicate whether the first terminal device continues to receive a signal or a channel associated with the first indication signal; and the first terminal device is a terminal device that needs to receive the first indication signal.

In a possible design, the first determining threshold corresponds to the first carrier, and the second determining threshold corresponds to the first carrier.

In a possible design, the first determining threshold is further used to instruct a second terminal device to determine whether to receive a second indication signal on a second carrier; the second determining threshold is used to instruct the second terminal device to determine, in case of receiving the second indication signal on the second carrier, whether to use the synchronization signal to synchronize with the network device; and the second terminal device is a terminal device that needs to receive the second indication signal.

In a possible design, the first configuration information indicates the first determining threshold, and the method further includes: determining, by the first terminal device, that a measurement value of a preset parameter is greater than or equal to the first determining threshold, and receiving, by the first terminal device, the first indication signal on the first carrier.

In a possible design, the first configuration information indicates the second determining threshold, and the method further includes: if the first terminal device determines that a measurement value of a preset parameter is less than the second determining threshold, receiving, by the first terminal device, the first indication signal on the first carrier, and using a synchronization signal to synchronize with the network device; or if the first terminal device determines that a measurement value of the preset parameter is greater than or equal to the second determining threshold, receiving, by the first terminal device, the first indication signal on the first carrier, and using the first indication signal to synchronize with the network device.

In a possible design, the first configuration information indicates the first determining threshold and the second determining threshold, and the method further includes: if the first terminal device determines that a measurement value of a preset parameter is greater than or equal to the first determining threshold and less than the second determining threshold, receiving, by the first terminal device, the first indication signal on the first carrier, and using a synchronization signal to synchronize with the network device; or if the first terminal device determines that a measurement value of the preset parameter is greater than or equal to the second determining threshold, receiving, by the first terminal device, the first indication signal on the first carrier, and using the first indication signal to synchronize with the network device.

According to a fifth aspect, this application provides an indication signal configuration apparatus, to perform the method in any one of the first aspect or the possible designs of the first aspect. Specifically, the apparatus includes units configured to perform the method in any one of the first aspect or the possible implementations of the first aspect.

According to a sixth aspect, this application provides an indication signal configuration apparatus, to perform the method in any one of the third aspect or the possible designs of the third aspect. Specifically, the apparatus includes units configured to perform the method in any one of the third aspect or the possible implementations of the third aspect.

According to a seventh aspect, this application provides an indication signal configuration apparatus, to perform the method in any one of the second aspect or the possible designs of the second aspect. Specifically, the apparatus includes units configured to perform the method in any one of the second aspect or the possible implementations of the second aspect.

According to an eighth aspect, this application provides an indication signal configuration apparatus, to perform the method in any one of the fourth aspect or the possible designs of the fourth aspect. Specifically, the apparatus includes units configured to perform the method in any one of the fourth aspect or the possible implementations of the fourth aspect.

According to a ninth aspect, this application provides a network device. The device includes a processor, a transceiver, and a memory. The memory may be configured to store program code, and the processor is configured to invoke the program code in the memory to perform the method in any one of the first aspect or the possible implementations of the first aspect. For specific execution steps, refer to the first aspect. Details are not described herein again.

According to a tenth aspect, this application provides a network device. The device includes a processor, a transceiver, and a memory. The memory may be configured to store program code, and the processor is configured to invoke the program code in the memory to perform the method in any one of the third aspect or the possible implementations of the third aspect. For specific execution steps, refer to the third aspect. Details are not described herein again.

According to an eleventh aspect, this application provides a terminal device. The device includes a processor, a transceiver, and a memory. The memory may be configured to store program code, and the processor is configured to invoke the program code in the memory to perform the method in any one of the second aspect or the possible implementations of the second aspect. For specific execution steps, refer to the second aspect. Details are not described herein again.

According to a twelfth aspect, this application provides a terminal device. The device includes a processor, a transceiver, and a memory. The memory may be configured to store program code, and the processor is configured to invoke the program code in the memory to perform the method in any one of the fourth aspect or the possible implementations of the fourth aspect. For specific execution steps, refer to the fourth aspect. Details are not described herein again.

According to a thirteenth aspect, an embodiment of this application further provides a computer-readable storage medium. The computer-readable storage medium stores a program. When the program is run on a computer, the computer is enabled to perform the methods in the foregoing aspects.

According to a fourteenth aspect, this application further provides a computer program product including a program. When the computer program product is run on a computer, the computer is enabled to perform the methods in the foregoing aspects.

DETAILED DESCRIPTION OF ILLUSTRATIVE EMBODIMENTS

The following describes the embodiments of this application with reference to the accompanying drawings. Technologies described in this application may be applied to wireless communications systems that use various radio access technologies, for example, systems that use access technologies such as code division multiple access (CDMA), frequency division multiple access (FDMA), time division multiple access (TDMA), orthogonal frequency division multiple access (OFDMA), and single carrier-frequency division multiple access (SC-FDMA). The technologies are also applicable to a subsequent evolved system such as a 5th generation 5G (also referred to as new radio (NR)) system.

Network elements in the embodiments of this application include a network device and a terminal. The network device is an access device for the terminal to wirelessly access the mobile communications system. The network device may be a base station (NodeB), an evolved base station (eNodeB), a base station in a 5G mobile communications system, a base station in a future mobile communications system, an access node in a Wi-Fi system, or the like. A specific technology and a specific device form used by the network device are not limited in the embodiments of this application.

The terminal device may be user equipment (UE), a mobile station (MS), a mobile terminal (MT), or the like. The terminal may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

Figure 1:
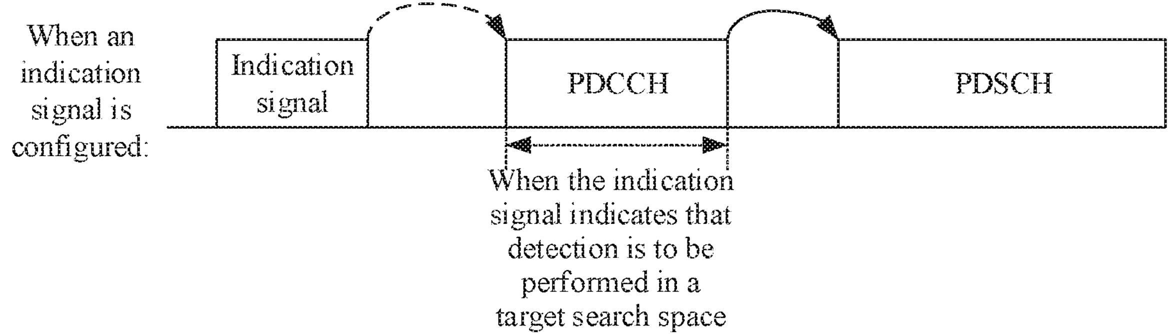
FIG. 1 is a schematic diagram 1 of detecting a PDCCH in a target search space by a terminal device based on an indication signal in the background.
Figure 2:
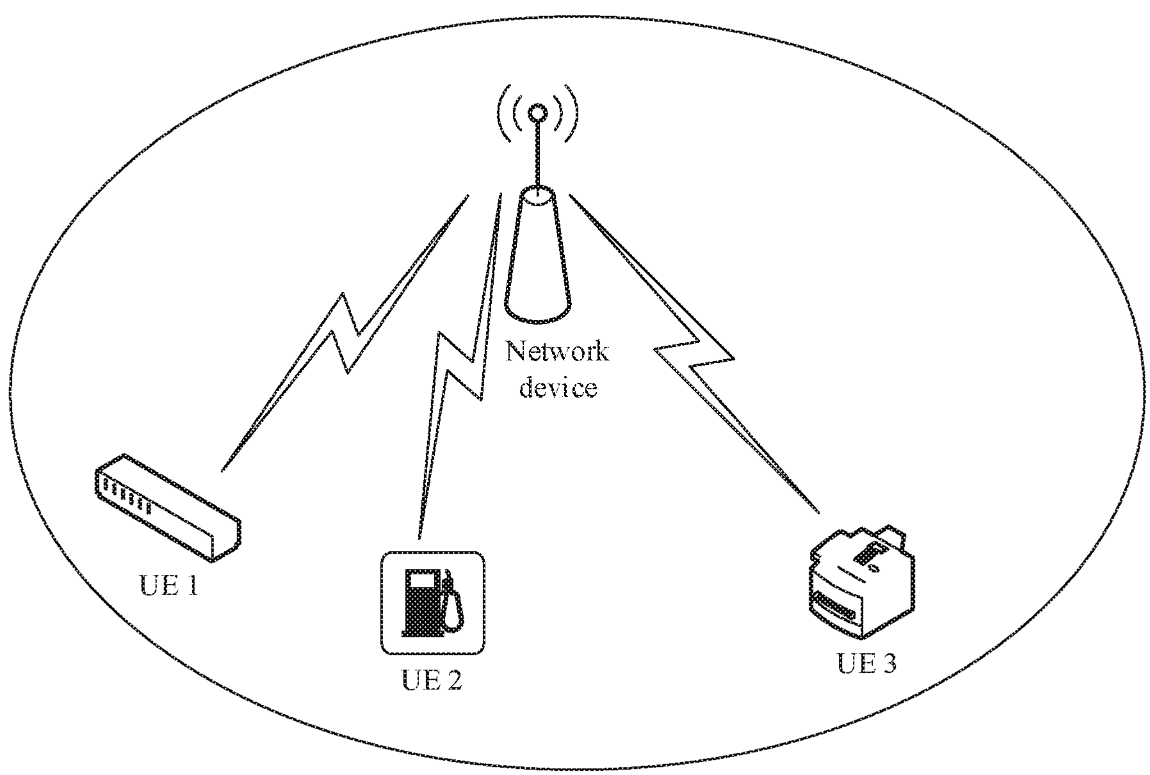
FIG. 2 is a schematic diagram of a system architecture according to an embodiment of this application.

A diagram of a system architecture in the embodiments of this application is shown in FIG. 2. A network device and user equipment (UE) 1 to UE 3 constitute a communications system. In the communications system, the UE 1 to the UE 3 may send uplink data to the network device, and the UE 1 to the UE 3 may also receive downlink data sent by the network device.

The embodiments of this application are mainly applied to the internet of things, the narrowband internet of things, or a new radio system.

Using the NB-IoT as an example, one NB-IoT carrier occupies 180 kHz in frequency domain, and corresponds to a width of 12 15-kHz subcarrier spacing in LTE. NB-IoT carriers are classified into an anchor NB-IoT carrier and a non-anchor NB-IoT carrier. The anchor NB-IoT carrier is a carrier that carries at least one of a PSS, an SSS, or a physical broadcast channel (PBCH), and the non-anchor carrier does not carry a PSS, an SSS, or a PBCH.

During initial network search, after a terminal device finds a PSS and an SSS and demodulates a PBCH, that is, after the terminal device finds an anchor NB-IoT carrier, the terminal device may camp on the anchor NB-IoT carrier. A non-anchor carrier may be configured on the anchor NB-IoT carrier by using system information block (SIB) information. The terminal device may complete paging based on the non-anchor carrier, and complete a random access procedure through a random access channel (RACH). For a terminal device in a connected mode, the network device may alternatively configure a non-anchor carrier for the terminal device by using radio resource control (RRC) signaling, and the terminal device and the network device may communicate with each other based on the non-anchor carrier.

Whether an indication signal can implement the foregoing two functions is related to duration of the indication signal, in addition to relating to whether a design of the indication signal can support the terminal device in using the indication signal to synchronize with the network device. Using the NB-IoT as an example, different NB-IoT carriers may have different transmit powers. Therefore, indication signals on different NB-IoT carriers have different coverage areas. For example, a transmitted indication signal with a 1-ms-subframe length can support only a terminal with a maximum coupling loss (MCL) of 144 dB, while a terminal device with an MCL of 164 dB may be incapable of reliably detecting the indication signal. Therefore, the duration of the indication signal is related to a coverage area of the indication signal. If the indication signal needs to meet a receiving requirement of a terminal device with worst cell coverage, comparatively long duration of the indication signal is required. If all terminal devices in a cell are enabled to be covered by the indication signal, duration of an indication channel may be excessively long. Consequently, comparatively high overheads of the indication signal may be caused, and scheduling of another service may be further affected. Based on this, the embodiments of this application provide an indication signal configuration method, to flexibly adjust a coverage area of an indication signal and control overheads of the indication signal.

In the embodiments of this application, the indication signal is also referred to as a wakeup signal (WUS) or a power saving signal. However, without loss of generality, all signals that are sent before an existing signal or channel and that are used by the terminal device to determine, based on the signals, whether to continue to receive signals associated with the signals or process channels associated with the signals fall within the scope of the indication signal in this application. The embodiments of this application are described by using a WUS as an example without loss of generality in this application.

Figure 3A:
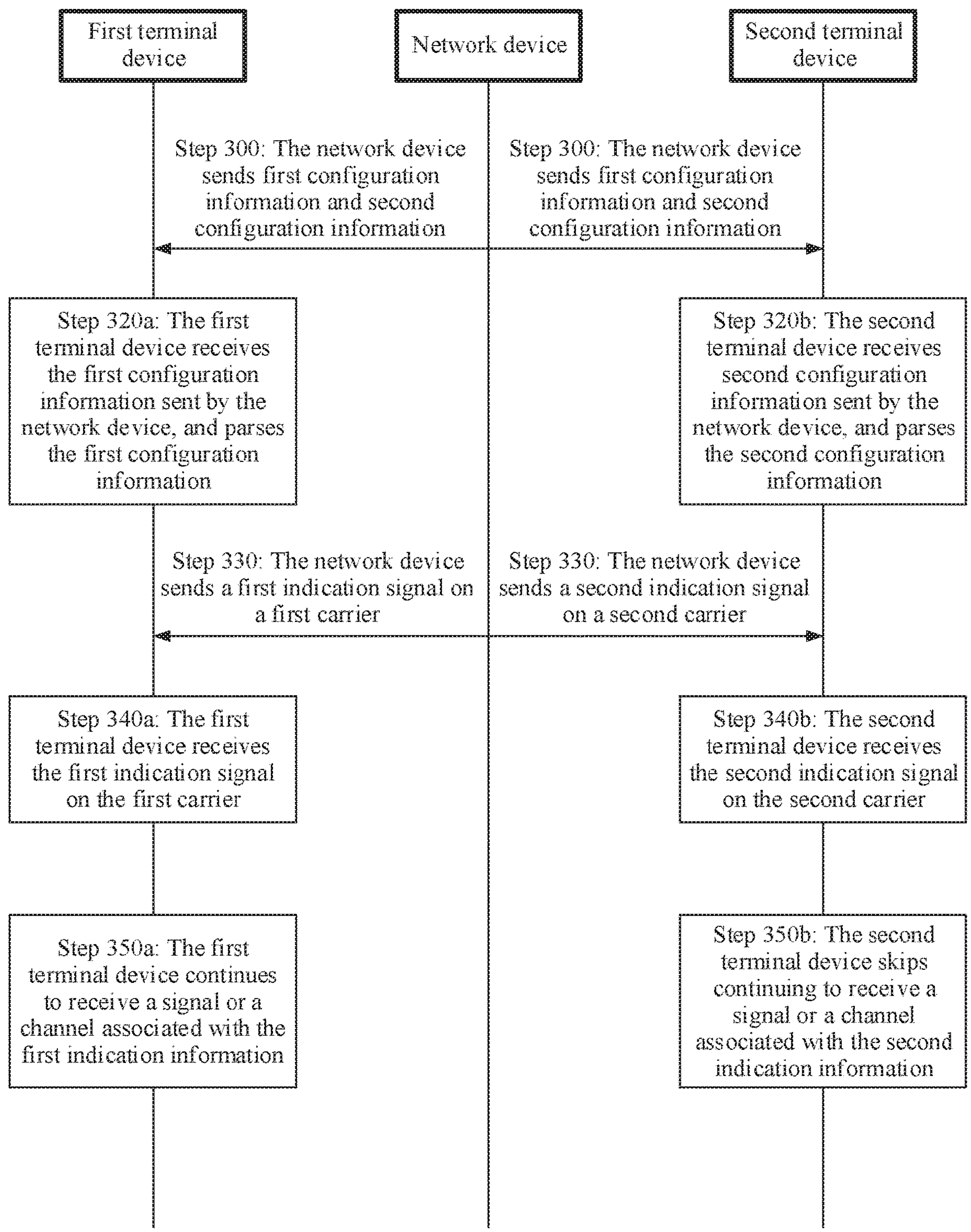
FIG. 3*a* and FIG. 3*b* are schematic flowcharts of an indication signal configuration method according to an embodiment of this application.

FIG. 3*a* is a flowchart of an indication signal configuration method. The method includes the following steps.

Step 300: A network device sends first configuration information and second configuration information.

The first configuration information is used to indicate duration of a first indication signal corresponding to a first carrier. The second configuration information is used to indicate duration of a second indication signal corresponding to a second carrier. The first indication signal is used to indicate whether a first terminal device needs to continue to receive a signal or a channel associated with the first indication information. The second indication information is used to indicate whether a second terminal device needs to continue to receive a signal or a channel associated with the second indication information. The first terminal device is a terminal device that needs to receive the first indication signal. The second terminal device is a terminal device that needs to receive the second indication signal.

It should be understood that the terminal device determines, based on an identifier of the terminal device and according to a preset rule, a carrier that needs to be processed or a working carrier, and further determines an indication signal that needs to be received. For example, the terminal device obtains a carrier ID through calculation based on a higher-layer user identifier and according to the preset rule that is agreed on with the network device, so that the terminal device determines to receive a paging message on a carrier corresponding to the carrier ID or send an uplink physical random access channel (PRACH) on a carrier corresponding to the carrier ID.

Specifically, the network device sends the first configuration information and the second configuration information on an anchor carrier in a broadcasting manner.

In a possible design, the duration of the first indication signal and the duration of the second indication signal are separately configured.

In a possible design, the duration of the first indication signal is different from the duration of the second indication signal.

In a possible design, the first carrier is an anchor carrier, and the second carrier is a non-anchor carrier; or the first carrier is a non-anchor carrier, and the second carrier is an anchor carrier.

In a possible design, configurations of the duration of the first indication signal and the duration of the second indication signal may be determined based on target coverage areas of the indication signals and a power difference between the first carrier and the second carrier. Without loss of generality, the target coverage area is a coverage area corresponding to a maximum MCL that can meet target detection performance (including false alarm rate and miss detection rate performance) of the terminal device. The MCL is a measure of coverage.

In a possible design, the first configuration information and the second configuration information may be carried in one message or two messages.

For example, when the first carrier is an anchor carrier and the second carrier is a non-anchor carrier, the network device may add the first configuration information and the second configuration information to two messages and broadcast the two messages to the terminal device. For another example, when the first carrier is a non-anchor carrier, and the second carrier is a non-anchor carrier, the network device may add the first configuration information and the second configuration information to different configuration fields of one message, and broadcast the message to the terminal device.

It should be understood that the foregoing uses only the first carrier and the second carrier as examples for description. The network device may broadcast a plurality of pieces of configuration information, and each piece of configuration information indicates duration of an indication signal corresponding to a carrier. Without loss of generality, this application further protects a case in which only one carrier is configured.

Specifically, the duration that is of the first indication signal corresponding to the first carrier and that is indicated or configured by using the first configuration information means that the first terminal device can determine, only after detecting the indicated or configured duration of the first indication signal, that the network device does not send the first indication signal. To ensure the false alarm and miss detection performance, the terminal device can determine that the first indication signal is not detected only after detecting a signal that is sent during a sufficiently long time (the configured duration) or performing joint detection on signals sent within the duration.

However, for the first terminal device, when the terminal device is located within better coverage, it is very likely to determine that the terminal device detects the first indication time within a time shorter than the configured duration length. Therefore, in implementation of the network device, if the network device determines that the first terminal device is located within better coverage, when the network device needs to send a WUS signal, an actual time length for which the network device sends the WUS may be shorter than the duration that is of the first indication signal corresponding to the first carrier and that is configured and indicated by the first configuration information.

Step 320*a*: The first terminal device receives the first configuration information sent by the network device, and parses the first configuration information.

It should be understood that the first terminal device can receive the first configuration information and the second configuration information that are sent by the network device.

Herein, it is assumed that a carrier determined by the first terminal device based on an identifier of the first terminal device and according to a preset rule is the first carrier, and the first terminal device supports to receive or needs to receive the first indication signal. Further, the first terminal device determines that configuration information that needs to be parsed is the first configuration information.

Step 320*b*: The second terminal device receives the second configuration information sent by the network device, and parses the second configuration information.

Similarly, the second terminal device can receive the first configuration information and the second configuration information that are sent by the network device. Herein, it is assumed that a carrier determined by the second terminal device based on an identifier of the second terminal device and according to a preset rule is the second carrier, and the second terminal device supports to receive or needs to receive the second indication signal. Further, the second terminal device determines that configuration information that needs to be parsed is the second configuration information.

Step 330: The network device sends the first indication signal on the first carrier, and sends the second indication signal on the second carrier.

Step 340*a*: The first terminal device receives the first indication signal on the first carrier.

Step 340*b*: The second terminal device receives the second indication signal on the second carrier.

In comparison with the prior art in which duration of one indication signal is uniformly configured for different carriers, in this embodiment of this application, the network device can flexibly adjust, based on duration of an indication signal corresponding to each carrier configuration, a coverage area corresponding to the indication signal, and can effectively control overheads of the indication signal.

Step 350*a*: The first terminal device continues to receive the signal or the channel associated with the first indication information.

In this case, the first indication signal instructs the first terminal device to continue to receive the signal or the channel associated with the first indication information.

Step 350*b*: The second terminal device skips continuing to receive the signal or the channel associated with the first indication information.

In this case, the second indication signal instructs the second terminal device to skip continuing to receive the signal or the channel associated with the second indication information.

Figure 3B:
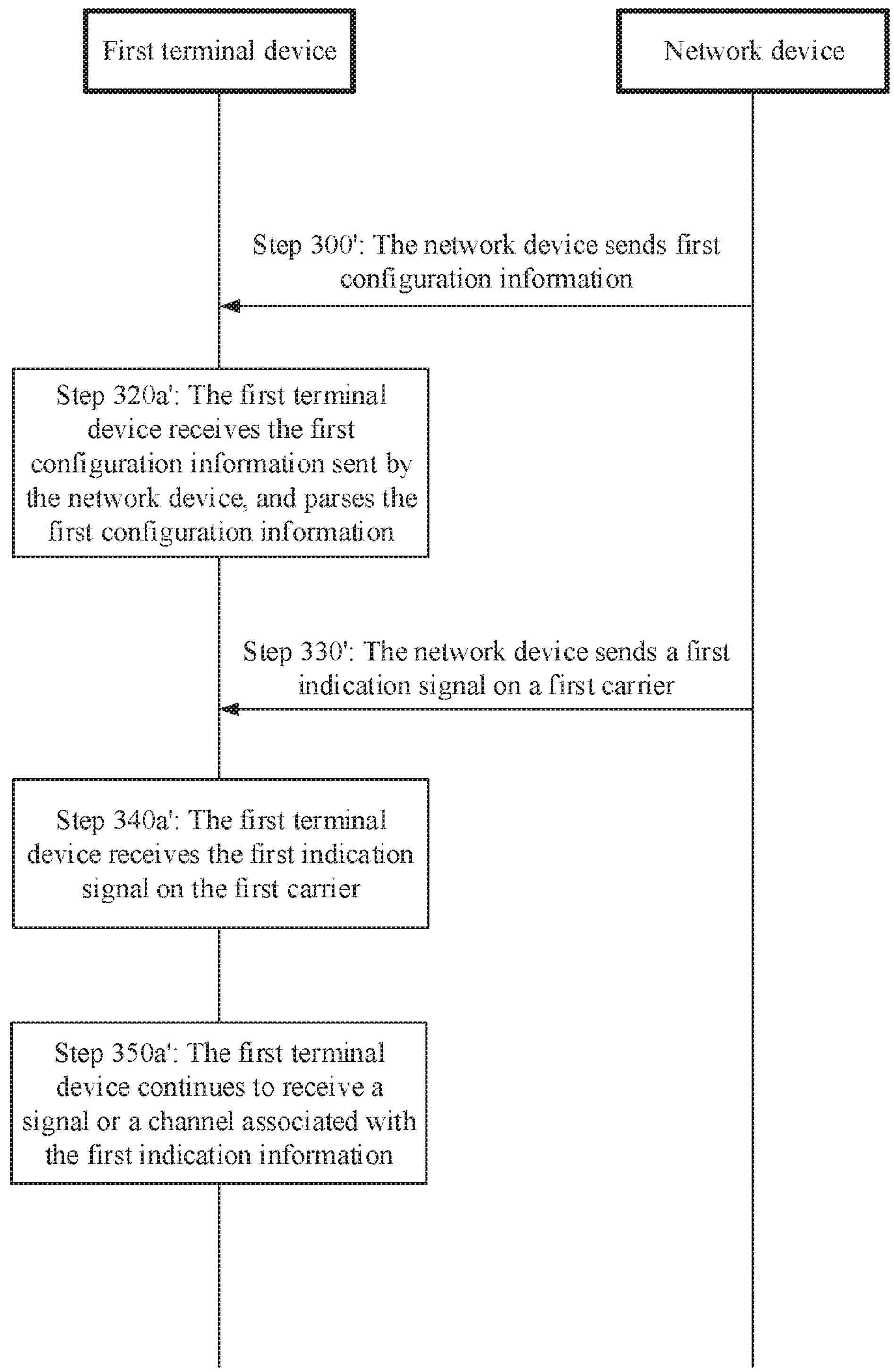

FIG. 3*b* is a flowchart of an indication signal configuration method. The method includes the following steps.

In another embodiment, the method includes the following steps.

Step 300': A network device sends first configuration information.

The first configuration information is used to indicate duration of a first indication signal corresponding to a first carrier, and the first indication signal is used to indicate whether a first terminal device needs to continue to receive a signal or a channel associated with the first indication information. The first terminal device is a terminal device that needs to receive the first indication signal.

It should be understood that the terminal device determines, based on an identifier of the terminal device and according to a preset rule, a carrier that needs to be processed or a working carrier, and further determines an indication signal that needs to be received. For example, the terminal device obtains a carrier ID through calculation based on a higher-layer user identifier and according to the preset rule that is agreed on with the network device, so that the terminal device determines to receive a paging message on a carrier corresponding to the carrier ID or send an uplink physical random access channel (PRACH) on a carrier corresponding to the carrier ID.

Specifically, the network device sends the first configuration information on an anchor carrier in a broadcasting manner.

In a possible design, the first carrier is an anchor carrier, or the first carrier is a non-anchor carrier.

In a possible design, a configuration of the duration of the first indication signal may be determined based on a target coverage area of the indication signal and a power difference between the first carrier and the anchor carrier. Without loss of generality, the target coverage area is a coverage area corresponding to a maximum MCL that can meet target detection performance (including false alarm and miss detection performance) of the terminal device. The MCL is a measure of coverage.

It should be understood that the foregoing uses only the first carrier as an example for description. The network device may broadcast a plurality of pieces of configuration information, and each piece of configuration information indicates duration of an indication signal corresponding to a carrier. Without loss of generality, this application further protects a case in which only one carrier is configured.

Specifically, the duration that is of the first indication signal corresponding to the first carrier and that is indicated or configured by using the first configuration information means that the first terminal device can determine, only after detecting the indicated or configured duration of the first indication signal, that the based station does not send the first indication signal. To ensure the false alarm and miss detection performance, the terminal device can determine that the first indication signal is not detected only after detecting a signal that is sent during a sufficiently long time (the configured duration) or performing joint detection on signals sent within the duration.

However, for the first terminal device, when the terminal device is located within better coverage, it is very likely to determine that the terminal device detects the first indication time within a time shorter than the configured duration length. Therefore, in implementation of the base station, if the base station determines that the first terminal device is located within better coverage, when the base station needs to send a WUS signal, an actual time length for which the base station sends the WUS may be shorter than the duration that is of the first indication signal corresponding to the first carrier and that is configured and indicated by the first configuration information.

Step 320*a*': The first terminal device receives the first configuration information sent by the network device, and parses the first configuration information.

It should be understood that the first terminal device can receive the first configuration information sent by the network device.

Herein, it is assumed that a carrier determined by the first terminal device based on an identifier of the first terminal device and according to a preset rule is the first carrier, and the first terminal device supports receiving or needs to receive the first indication signal. Further, the first terminal device determines that configuration information that needs to be parsed is the first configuration information.

Step 330': The network device sends the first indication signal on the first carrier.

Step 340*a*': The first terminal device receives the first indication signal on the first carrier.

In comparison with the prior art in which duration of one indication signal is uniformly configured for different carriers, in this embodiment of this application, the network device can flexibly adjust, based on duration of an indication signal corresponding to each carrier configuration, a coverage area corresponding to the indication signal, and can effectively control overheads of the indication signal.

Step 350*a*': The first terminal device continues to receive the signal or the channel associated with the first indication information. In this case, the first indication signal instructs the first terminal device to continue to receive the signal or the channel associated with the first indication information; or the terminal device skips continuing to receive the signal or the channel associated with the first indication information. In this case, the first indication signal instructs the first terminal device to skip continuing to receive the signal or the channel associated with the first indication information.

Further, the embodiments of this application further provide the following several types of configurations for the indication signal by the network device. The following uses an example in which only the first terminal device receives an indication signal for description. Another terminal device has a same processing process. The following configuration does not depend on the embodiment shown in FIG. 2, and may be used independently.

Manner 1: The first configuration information further indicates a first determining threshold, and the first determining threshold is used to instruct the first terminal device to determine whether to receive the first indication signal on the first carrier.

Specifically, if the first terminal device determines that a measurement value of a preset parameter is less than the first determining threshold corresponding to the first carrier, the first terminal device does not receive the first indication signal on the first carrier; or if the first terminal device determines that a measurement value of a preset parameter is greater than or equal to the first determining threshold corresponding to the first carrier, the first terminal device receives the first indication signal on the first carrier.

Further, receiving the first indication signal on the first carrier means that the terminal device receives the first indication signal, and determines, based on an indication of the first indication signal, whether to continue to receive the signal associated with the first indication signal or process the channel associated with the first indication signal. If the first indication signal instructs the terminal device to continue to receive the signal associated with the first indication signal or process the channel associated with the first indication signal, the terminal device continues to receive the signal associated with the first indication signal or process the channel associated with the first indication signal; or if the first indication signal instructs the terminal device to skip continuing to receive the signal associated with the first indication signal or process the channel associated with the first indication signal, the terminal device does not receive the signal associated with the first indication signal or process the channel associated with the first indication signal. Optionally, the terminal device may turn off a receiver to reduce power consumption. Not receiving the first indication signal on the first carrier means that the terminal device does not use the first indication signal, but directly receives the signal associated with the first indication signal or processes the channel associated with the first indication signal.

It can be learned from the foregoing descriptions that when the measurement value of the preset parameter is less than the first determining threshold corresponding to the first carrier, the first terminal device is located outside the target coverage area of the first indication signal, for example, the first terminal device is located in a cell edge area or a poor coverage area. If the first terminal device still determines, by receiving the indication signal, whether the first terminal device needs to continue to receive the signal associated with the indication information or process the channel associated with the indication signal, due to missing detection of the indication signal, there is a high probability that the first terminal device does not receive the associated signal that needs to be received or does not process the associated channel that needs to be processed. This causes data loss, and affects communication between the first terminal device and the network device.

It should be understood that the first determining threshold herein is configured for the first carrier, and the network device may configure different determining thresholds for different carriers. For example, second configuration information further indicates a second determining threshold, and the second determining threshold is used to instruct a second terminal device to determine whether to receive a second indication signal on a second carrier. Alternatively, the network device may uniformly configure a same determining threshold for different carriers. For details, refer to Manner 4 in the following.

Manner 2: The first configuration information further indicates a third determining threshold.

The third determining threshold corresponding to the first carrier is used to instruct the first terminal device to determine, in case of receiving the first indication signal on the first carrier, whether to use a synchronization signal to synchronize with the network device.

Specifically, if the first terminal device determines that a measurement value of a preset parameter is less than the third determining threshold, the first terminal device first uses the synchronization signal to synchronize with the network device, and then receives the first indication signal on the first carrier. Alternatively, in another implementation, if the first terminal device determines that a measurement value of a preset parameter is less than the third determining threshold, the first terminal device does not use the synchronization signal to perform synchronization before receiving the first indication signal on the first carrier, but after receiving the first indication signal before receiving the signal associated with the first indication signal or processing the channel associated with the first indication signal, uses the synchronization signal to synchronize with the network device; or if the first terminal device determines that a measurement value of a preset parameter is greater than or equal to the third determining threshold, the first terminal device receives the first indication signal on the first carrier, and uses the first indication signal to synchronize with the network device.

It can be learned from the foregoing descriptions that when the measurement value of the preset parameter is less than the third determining threshold, if the first terminal device still uses the indication signal to synchronize with the network device, this may cause a synchronization failure, and affect communication between the first terminal device and the network device. Therefore, the first terminal device needs to use the synchronization signal (for example, a PSS and an SSS) to synchronize with the network device.

It should be understood that the third determining threshold herein is configured for the first carrier, and the network device may configure different determining thresholds for different carriers. For example, second configuration information further indicates a fourth determining threshold, and the fourth determining threshold is used to instruct the second terminal device to determine, in case of receiving the second indication signal on the second carrier, whether to use the synchronization signal to synchronize with the network device. Alternatively, the network device may uniformly configure a same determining threshold for different carriers. For details, refer to Manner 5 in the following.

Manner 3: The first configuration information further indicates a fifth determining threshold and a sixth determining threshold. The fifth determining threshold is less than the sixth determining threshold.

The fifth determining threshold and the sixth determining threshold are used to instruct the first terminal device to determine whether to receive the first indication signal on the first carrier, and determine, in case of receiving the first indication signal on the first carrier, whether to use a synchronization signal to synchronize with the network device.

If the first terminal device determines that a measurement value of a preset parameter is less than the fifth determining threshold, the first terminal device does not receive the first indication signal on the first carrier.

If the first terminal device determines that a measurement value of a preset parameter is greater than or equal to the fifth determining threshold and less than the sixth determining threshold, the first terminal device first uses the synchronization signal to synchronize with the network device, and then receives the first indication signal on the first carrier; or if the first terminal device determines that a measurement value of a preset parameter is greater than or equal to the fifth determining threshold and less than the sixth determining threshold, after receiving the first indication signal on the first carrier, the first terminal device uses the synchronization signal to synchronize with the network device.

If the first terminal device determines that a measurement value of a preset parameter is greater than or equal to the sixth determining threshold, the first terminal device receives the first indication signal on the first carrier, and uses the first indication signal to synchronize with the network device.

Manner 3 may be considered as a combination of Manner 1 and Manner 2. For details, refer to the specific descriptions of Manner 1 and Manner 2. Repeated parts are not described again.

It should be understood that the fifth determining threshold and the sixth determining threshold herein are configured for the first carrier, and the network device may configure different determining thresholds for different carriers. For example, second configuration information further indicates a seventh determining threshold and an eighth determining threshold. The seventh determining threshold is less than the eighth determining threshold. The seventh determining threshold and the eighth determining threshold are used to instruct the second terminal device to determine whether to receive the second indication signal on the second carrier, and determine, in case of receiving the second indication signal on the second carrier, whether to use the synchronization signal to synchronize with the network device. Alternatively, the network device may uniformly configure a same determining threshold for different carriers. For details, refer to Manner 6 in the following.

It should be understood that the fifth determining threshold may be equal to or unequal to the first determining threshold in Manner 1, and the sixth determining threshold may be equal to or unequal to the third determining threshold in Manner 2.

According to the method provided in Manner 3, the first terminal device can accurately determine, based on the measurement value of the preset parameter, the fifth determining threshold, and the sixth determining threshold, a case in which an indication signal is not received, a case in which an indication signal is received but the indication signal is not used to synchronize with the network device, and a case in which an indication signal is received and the indication signal is used to synchronize with the network device. Therefore, in Manner 3, it can be better ensured that the first terminal device and the network device normally communicate with each other, and ensured that the terminal device always selects a low-power-consumption manner to communicate with the network device.

It should be understood that the determining thresholds in Manner 1 to Manner 3 are all based on a carrier configuration, that is, the network device needs to configure a corresponding determining threshold for each carrier. Alternatively, the network device may uniformly configure a same determining threshold for different carriers. A difference between Manner 4 to Manner 6 and Manner 1 to Manner 3 lies in that the network device configures only one determining threshold if determining thresholds have a same function.

Manner 4: The network device sends third configuration information, where the third configuration information indicates a ninth determining threshold. The ninth determining threshold is used to instruct the terminal device that needs to receive the first indication signal to determine whether to receive the first indication signal on the first carrier, and is used to instruct the second terminal device to determine whether to receive the second indication signal on the second carrier.

It should be understood that the first carrier and the second carrier herein are merely examples, and other carriers configured in the cell may be further included. Therefore, regardless of which carrier is determined by the first terminal device, the ninth determining threshold may be used to determine whether the corresponding indication signal is received on the determined carrier.

For example, if a carrier determined by a terminal device A is the first carrier, and the terminal device A determines that a measurement value of a preset parameter is greater than or equal to the ninth determining threshold, the terminal device A receives the first indication signal on the first carrier; or if the terminal device A determines that a measurement value of a preset parameter is less than the ninth determining threshold, the terminal device A does not receive the first indication signal on the first carrier.

For example, if a carrier determined by the terminal device A is the second carrier, and the terminal device A determines that a measurement value of a preset parameter is greater than or equal to the ninth determining threshold, the terminal device A receives the second indication signal on the second carrier; or if the terminal device A determines that a measurement value of a preset parameter is less than the ninth determining threshold, the terminal device A does not receive the second indication signal on the second carrier.

Therefore, a function of the ninth determining threshold herein is the same as a function of the first determining threshold in Manner 1. According to the method provided in Manner 4, the network device does not need to separately configure a determining threshold for each carrier, and all carriers share one determining threshold, that is, the ninth determining threshold.

Manner 5: The network device sends fourth configuration information, where the fourth configuration information indicates a tenth determining threshold.

The tenth determining threshold is used to instruct the first terminal device to determine, in case of receiving the first indication signal on the first carrier, whether to use a synchronization signal to synchronize with the network device; and is used to instruct the second terminal device to determine, in case of receiving the second indication signal on the second carrier, whether to use the synchronization signal to synchronize with the network device.

If the first terminal device determines that a measurement value of a preset parameter is less than the tenth determining threshold, the first terminal device first uses the synchronization signal to synchronize with the network device, and then receives the first indication signal on the first carrier. Alternatively, if the first terminal device determines that a measurement value of a preset parameter is less than the tenth determining threshold, after receiving the first indication signal on the first carrier, the first terminal device uses the synchronization signal to synchronize with the network device.

If the first terminal device determines that a measurement value of a preset parameter is greater than or equal to the tenth determining threshold, the first terminal device receives the first indication signal on the first carrier, and uses the first indication signal to synchronize with the network device.

Therefore, a function of the tenth determining threshold herein is the same as a function of the third determining threshold in Manner 2. According to the method provided in Manner 5, the network device does not need to separately configure a determining threshold for each carrier, and all carriers share one determining threshold, that is, the tenth determining threshold.

Manner 6: The network device sends fifth configuration information, where the fifth configuration information indicates an eleventh determining threshold and a twelfth determining threshold.

The eleventh determining threshold and the twelfth determining threshold are used to instruct the first terminal device to determine whether to receive the first indication signal on the first carrier, and determine, in case of receiving the first indication signal on the first carrier, whether to use a synchronization signal to synchronize with the network device; and are used to instruct the second terminal device to determine whether to receive the second indication signal on the second carrier, and determine, in case of receiving the second indication signal on the second carrier, whether to use the synchronization signal to synchronize with the network device. The eleventh determining threshold is less than the twelfth determining threshold.

A carrier determined by the first terminal device is the first carrier. If the first terminal device determines that a measurement value of a preset parameter is less than the eleventh determining threshold, the first terminal device does not receive the first indication signal on the first carrier.

If the first terminal device determines that a measurement value of a preset parameter is greater than or equal to the eleventh determining threshold and less than the twelfth determining threshold, the first terminal device first uses the synchronization signal to synchronize with the network device, and then receives the first indication signal on the first carrier; or if the first terminal device determines that a measurement value of a preset parameter is greater than or equal to the eleventh determining threshold and less than the twelfth determining threshold, after receiving the first indication signal on the first carrier, the first terminal device uses the synchronization signal to synchronize with the network device.

If the first terminal device determines that a measurement value of a preset parameter is greater than or equal to the twelfth determining threshold, the first terminal device receives the first indication signal on the first carrier, and uses the first indication signal to synchronize with the network device.

The measurement value of the preset parameter in Manner 1 to Manner 6 may be an RSRP value obtained by the terminal device through measurement based on an NPSSS and an NSSS that are sent on an anchor carrier.

For example, for Manner 1, when the RSRP value is greater than the first determining threshold, the first terminal device receives the first indication signal on the first carrier, and determines, by using the first indication signal, whether the signal associated with the first indication signal needs to be received or the channel associated with the first indication signal needs to be processed; or when the RSRP value is less than the first determining threshold, the first terminal device does not receive the first indication signal, but directly receives the signal associated with the first indication signal or processes the channel associated with the first indication signal.

Similarly, for Manner 4, when the RSRP value is greater than the ninth determining threshold, the first terminal device receives the first indication signal on the first carrier, and determines, by using the first indication signal, whether the signal associated with the first indication signal needs to be received or the channel associated with the first indication signal needs to be processed; or when the RSRP value is less than the ninth determining threshold, the first terminal device does not receive the first indication signal, but directly receives the signal associated with the first indication signal or processes the channel associated with the first indication signal.

For another example, for Manner 2, when the RSRP value is greater than the third determining threshold, it indicates that the first terminal device receives the first indication signal on the first carrier, and uses the first indication signal to directly perform synchronization; or when the RSRP value is less than the third determining threshold, the first terminal device does not use the first indication signal to perform synchronization, but uses the synchronization signal to perform synchronization before or after receiving the first indication signal.

Similarly, for Manner 5, when the RSRP value is greater than the tenth determining threshold, it indicates that the first terminal device receives the first indication signal on the first carrier, and uses the first indication signal to directly perform synchronization; or when the RSRP value is less than the third determining threshold, the first terminal device does not use the first indication signal to perform synchronization, but uses the synchronization signal to perform synchronization before or after receiving the first indication signal.

For another example, for Manner 3, when the RSRP value is less than the fifth determining threshold, the first terminal device does not receive the first indication signal, but directly receives the signal associated with the first indication signal or processes the channel associated with the first indication signal; when the RSRP value is greater than the fifth determining threshold and less than the sixth determining threshold, the first terminal device does not use the first indication signal to perform synchronization, but uses the synchronization signal to perform synchronization before or after receiving the first indication signal; or when the RSRP value is greater than the sixth determining threshold, the first terminal device receives the first indication signal on the first carrier, and uses the first indication signal to directly perform synchronization.

Similarly, for Manner 6, when the RSRP value is less than the eleventh determining threshold, the first terminal device does not receive the first indication signal, but directly receives the signal associated with the first indication signal or processes the channel associated with the first indication signal; when the RSRP value is greater than the eleventh determining threshold and less than the twelfth determining threshold, the first terminal device does not use the first indication signal to perform synchronization, but uses the synchronization signal to perform synchronization before or after receiving the first indication signal; or when the RSRP value is greater than the twelfth determining threshold, the first terminal device receives the first indication signal on the first carrier, and uses the first indication signal to directly perform synchronization.

Without loss of generality, the measurement value of the preset parameter may be alternatively a measurement value of another parameter, and a determining condition may accordingly change. For example, if the preset parameter is a quantity of subframes required by the terminal device to receive a paging message, a smaller quantity of subframes indicates better signal coverage in an area in which the terminal device is located, and indicates better signal quality of an indication signal received by the terminal device. For another example, if the preset parameter is a transmission time length required by the terminal device to achieve WUS detection performance, a shorter required transmission time length indicates better signal coverage of an area in which the terminal device is located, and indicates better signal quality of an indication signal received by the terminal device. In this case, the threshold is a WUS sending time length configured by the network.

In this case, for Manner 1, the determining condition correspondingly changes to: If the first terminal device determines that the measurement value of the preset parameter is greater than the first determining threshold, the first terminal device does not receive the first indication signal on the first carrier; or if the first terminal device determines that the measurement value of the preset parameter is less than or equal to the first determining threshold, the first terminal device receives the first indication signal on the first carrier.

Similarly, for Manner 4, only the first determining threshold needs to be replaced with the ninth determining threshold.

For Manner 2, the determining condition correspondingly changes to: If the first terminal device determines that the measurement value of the preset parameter is greater than or equal to the third determining threshold, the first terminal device first uses the synchronization signal to synchronize with the network device, and then receives the first indication signal on the first carrier; or if the first terminal device determines that the measurement value of the preset parameter is greater than or equal to the third determining threshold, the first terminal device does not use the synchronization signal to perform synchronization before receiving the first indication signal on the first carrier, but after receiving the first indication signal before receiving the signal associated with the first indication signal or processing the channel associated with the first indication signal, uses the synchronization signal to synchronize with the network device; or if the first terminal device determines that the measurement value of the preset parameter is less than the third determining threshold, the first terminal device receives the first indication signal on the first carrier, and uses the first indication signal to synchronize with the network device.

Similarly, for Manner 5, only the third determining threshold needs to be replaced with the tenth determining threshold.

For Manner 3, if the first terminal device determines that the measurement value of the preset parameter is greater than or equal to the sixth determining threshold, the first terminal device does not receive the first indication signal on the first carrier.

If the first terminal device determines that the measurement value of the preset parameter is greater than or equal to the fifth determining threshold and less than the sixth determining threshold, the first terminal device first uses the synchronization signal to synchronize with the network device, and then receives the first indication signal on the first carrier; or if the first terminal device determines that the measurement value of the preset parameter is greater than or equal to the fifth determining threshold and less than the sixth determining threshold, after receiving the first indication signal on the first carrier, the first terminal device uses the synchronization signal to synchronize with the network device.

If the first terminal device determines that the measurement value of the preset parameter is less than the fifth determining threshold, the first terminal device receives the first indication signal on the first carrier, and uses the first indication signal to synchronize with the network device.

Similarly, for Manner 6, only the fifth determining threshold needs to be replaced with the eleventh determining threshold and the sixth determining threshold needs to be replaced with the twelfth determining threshold.

Without loss of generality, the network device may configure different measurement values of preset parameters and corresponding first determining thresholds based on a relationship between a measurement value of a preset parameter and signal coverage of an area in which the first terminal device is located; and based on a configuration of the network device, the first terminal device determines, based on an indication of the first indication signal, whether to receive the signal associated with the first indication signal or process the channel associated with the first indication signal.

Generally, when signal receiving quality corresponding to the measurement value, obtained through measurement by the first terminal device, of the preset parameter is lower than signal receiving quality corresponding to the first determining threshold, the first terminal device does not receive the first indication signal on the first carrier, and does not use the first indication signal to determine whether to receive the signal associated with the first indication signal or process the channel associated with the first indication signal; or when signal receiving quality corresponding to the measurement value, obtained through measurement by the first terminal device, of the preset parameter is higher than or the same as signal receiving quality corresponding to the first determining threshold, the first terminal device receives the first indication signal on the first carrier, and uses the first indication signal to determine whether to receive the signal associated with the first indication signal or process the channel associated with the first indication signal.

Similarly, when signal receiving quality corresponding to the measurement value, obtained through measurement by the first terminal device, of the preset parameter is lower than signal receiving quality corresponding to the third determining threshold, the first terminal device does not use the first indication signal to perform synchronization; or when signal receiving quality corresponding to the measurement value, obtained through measurement by the first terminal device, of the preset parameter is higher than or the same as signal receiving quality corresponding to the third determining threshold, the first terminal device uses the first indication signal to perform synchronization.

Therefore, a function of the eleventh determining threshold herein is the same as a function of the fifth determining threshold in Manner 3, a function of the twelfth determining threshold is the same as a function of the sixth determining threshold in Manner 3. According to the method provided in Manner 6, the network device does not need to separately configure two determining thresholds for each carrier, and all carriers share the eleventh determining threshold and the twelfth determining threshold.

In an example, the determining thresholds mentioned in Manner 1 to Manner 6 are all set for a reference signal received power (RSRP). The first terminal device receives a reference signal on an anchor carrier, and determines an RSRP corresponding to the reference signal as the measurement value of the preset parameter. The anchor carrier herein may be the first carrier, the second carrier, or another carrier.

Without loss of generality, the measurement value of the preset parameter may be alternatively another parameter, and the determining condition may accordingly change. For example, if the preset parameter is a quantity of subframes required by the terminal device to receive a paging message, a smaller quantity of subframes indicates better coverage for the terminal device. In this case, the determining condition in this solution of this application is correspondingly adjusted.

For another example, the measurement value of the preset parameter is a WUS sending time length required when the terminal device detects that a WUS meets preset detection performance, and a configured threshold is a WUS sending time length configured by the network. In this case, a smaller measurement value of the preset parameter indicates better coverage for the terminal device. In this case, the determining condition in this solution of this application is correspondingly adjusted.

Without loss of generality, based on a relationship between a measurement value of a preset parameter and terminal coverage, different relationships between measurement values of preset parameters and determining thresholds are used to determine whether to use the first indication information to perform synchronization. Generally, when terminal coverage corresponding to the measurement value of the preset parameter is poorer than terminal coverage corresponding to the determining threshold, the first terminal device does not receive the first indication signal on the first carrier, and does not use the first indication signal to determine whether to process a subsequent associated channel or signal; or when terminal coverage corresponding to the measurement value of the preset parameter is better than or the same as terminal coverage corresponding to the determining threshold, the first terminal device receives the first indication signal on the first carrier, and determines, by using the first indication signal, whether to process a subsequent associated channel or signal.

Without loss of generality, based on a relationship between a measurement value of a preset parameter and terminal coverage, different relationships between measurement values of preset parameters and determining thresholds are used to determine whether to use the first indication information to perform synchronization. Generally, when terminal coverage corresponding to the measurement value of the preset parameter is poorer than terminal coverage corresponding to the determining threshold, the first terminal device does not use the first indication signal on the first carrier to perform synchronization; or when terminal coverage corresponding to the measurement value of the preset parameter is better than or the same as terminal coverage corresponding to the determining threshold, the first terminal device uses the first indication signal to perform synchronization.

The following describes the foregoing manners with reference to specific embodiments.

Figure 4:
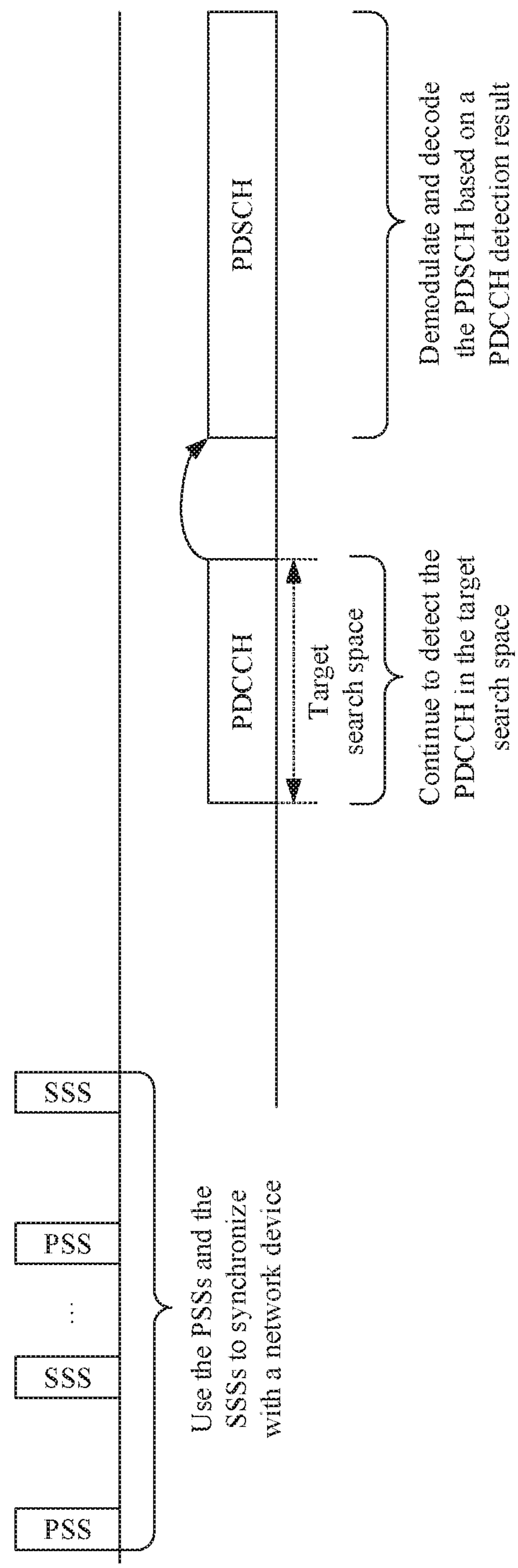
FIG. 4 is a schematic diagram of detecting a PDCCH in a target search space by a terminal device according to an embodiment of this application.

In the prior art, when the terminal device is in an idle mode, the network device configures an idle mode discontinuous reception cycle (IDLE mode DRX cycle, referred to as DRX cycle below), and the terminal device wakes up at time locations of these DRX cycles used as cycles. The time location is referred to as a paging occasion (PO). The terminal device detects a common search space starting from a PO. If the terminal device detects a PDCCH scheduled to the terminal device, that is, DCI carried on the PDCCH is scrambled by using a paging-radio network temporary identifier (P-RNTI), the terminal device demodulates and decodes a paging message carried on a PDSCH scheduled by using the DCI. As shown in FIG. 4, it can be learned that before the terminal device detects the common search space starting from the PO, because the terminal device is no longer in synchronization with the network device after the terminal device sleeps for duration of a DRX cycle, the terminal device needs to synchronize with the network device. For example, the terminal device synchronizes with the network device by using a PSS or an SSS. Therefore, after an indication signal (for example, a WUS) is introduced, the terminal device may not need to use the PSS and the SSS to synchronize with the network device, but use the indication signal to synchronize with the network device, thereby further reducing power consumption of the terminal device.

Specifically, the terminal device may read the WUS in the following three manners.

Procedure 1: This procedure is used to determine whether the terminal device needs to further receive subsequent paging, that is, determine whether to detect the PDCCH in the common search space starting from the PO, but the terminal device needs to synchronize with the network device first.

Figure 5A:
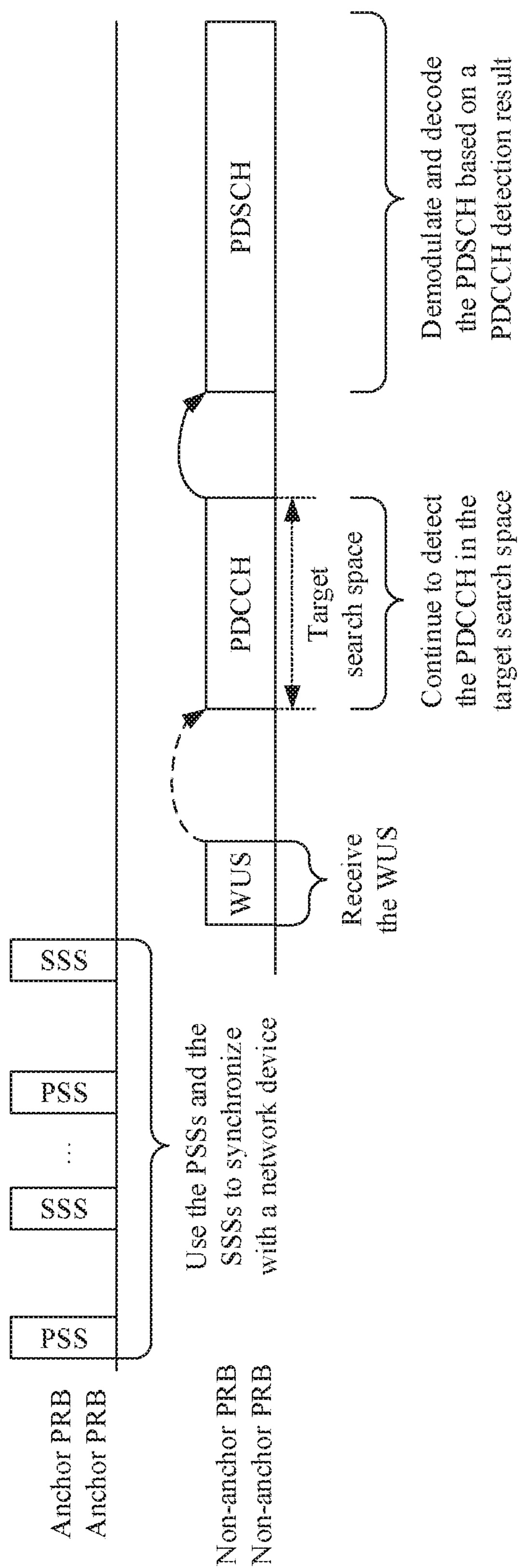
FIG. 5*a* and FIG. 5*b* are schematic diagrams 2 of detecting a PDCCH in a target search space by a terminal device based on an indication signal according to an embodiment of this application.
Figure 5B:
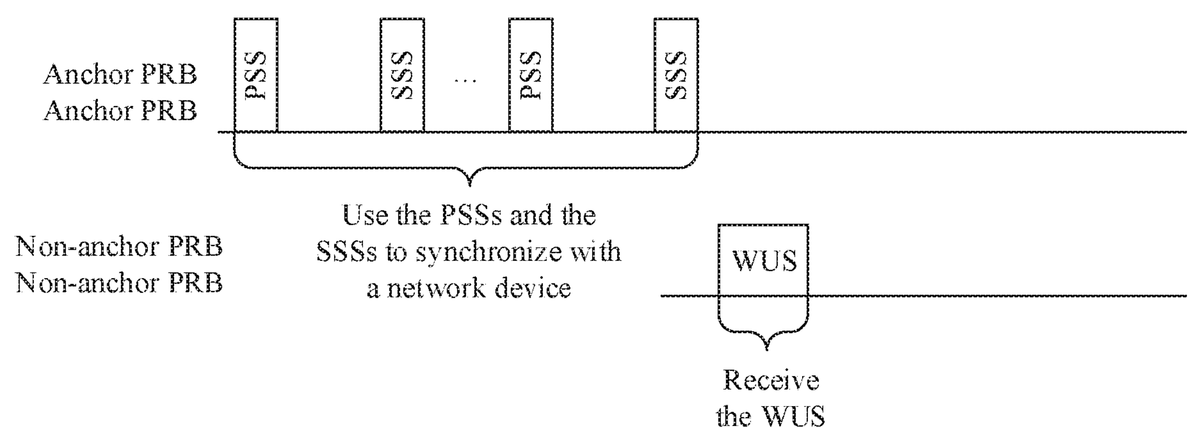

Specifically, before receiving the WUS, the terminal device first synchronizes with the network device by using the PSS and the SSS. After completing the synchronization, the terminal device receives the WUS. If indication information carried in the WUS instructs the terminal device to continue to process a subsequent associated PDCCH and PDSCH, the terminal device continues to detect the PDCCH in the common search space starting from the PO, as shown in FIG. 5*a*. If indication information carried in the received WUS instructs the terminal device not to process a subsequent associated PDCCH and PDSCH, the terminal device does not need to continue to detect the PDCCH in the common search space starting from the PO, as shown in FIG. 5*b*.

Specifically, the WUS may carry, in the following manner, the indication information to indicate whether the terminal device continues to process the subsequent associated channel or signal: When a preset WUS signal is sent, it indicates that the terminal device is instructed to continue to process the subsequent associated channel or signal; or when no preset WUS signal is sent (in this case, the network device may send another signal or scheduling data, which is generally denoted as sending DTX), it indicates that the terminal device is instructed to skip continuing to process the subsequent associated channel or signal.

In another example, the WUS may carry, in the following manner, the indication information to indicate whether the terminal device continues to process the subsequent associated channel or signal: When a preset WUS signal 1 is sent, it indicates that the terminal device is instructed to continue to process the subsequent associated channel or signal; or when a preset WUS signal 2 is sent, it indicates that the terminal device is instructed to skip continuing to process the subsequent associated channel or signal.

The foregoing are two examples in which the indication information carried in the WUS indicates whether the terminal device continues to process the subsequent associated channel or signal. This application is not limited to the foregoing two manners.

Procedure 2: This procedure is used to determine whether the terminal device needs to further receive subsequent paging, that is, determine whether to detect the PDCCH in the common search space starting from the PO, and the terminal device may use a WUS to implement time-frequency synchronization with the network device, and directly detect the PDCCH in the common search space starting from the PO.

Figure 6A:
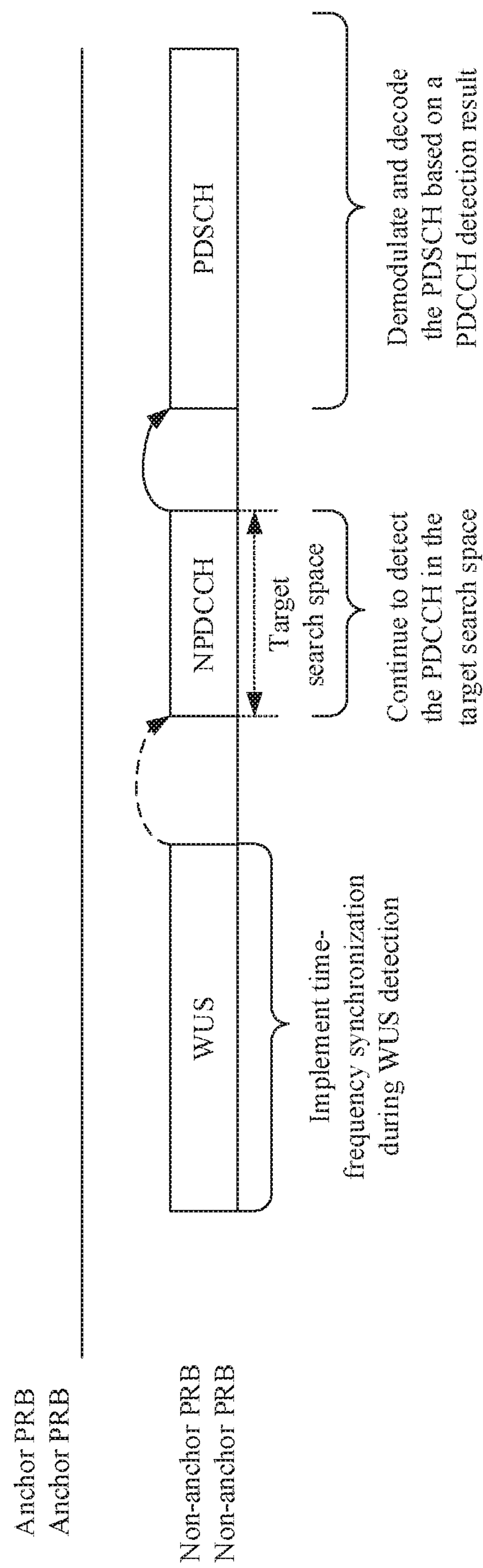
FIG. 6*a* and FIG. 6*b* are schematic diagrams 3 of detecting a PDCCH in a target search space by a terminal device based on an indication signal according to an embodiment of this application.
Figure 6B:
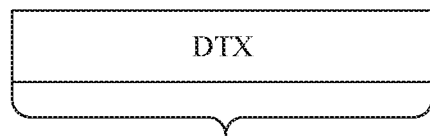

Specifically, the terminal device receives the WUS. If the terminal device receives the WUS, and the terminal device simultaneously implements time-frequency synchronization with the network device, the terminal device directly continues to detect the PDCCH in the common search space starting from the PO, as shown in FIG. 6*a*; or if the terminal device receives no WUS, the terminal device does not need to continue to detect the PDCCH in the common search space starting from the PO, as shown in FIG. 6*b*.

Procedure 3: This procedure is used to determine whether the terminal device needs to further receive subsequent paging, that is, determine whether to detect the PDCCH in the common search space starting from the PO. However, after receiving a WUS, the terminal device needs to first synchronize with the network device, and then the terminal device detects the PDCCH in the common search space starting from the PO.

Figure 7:
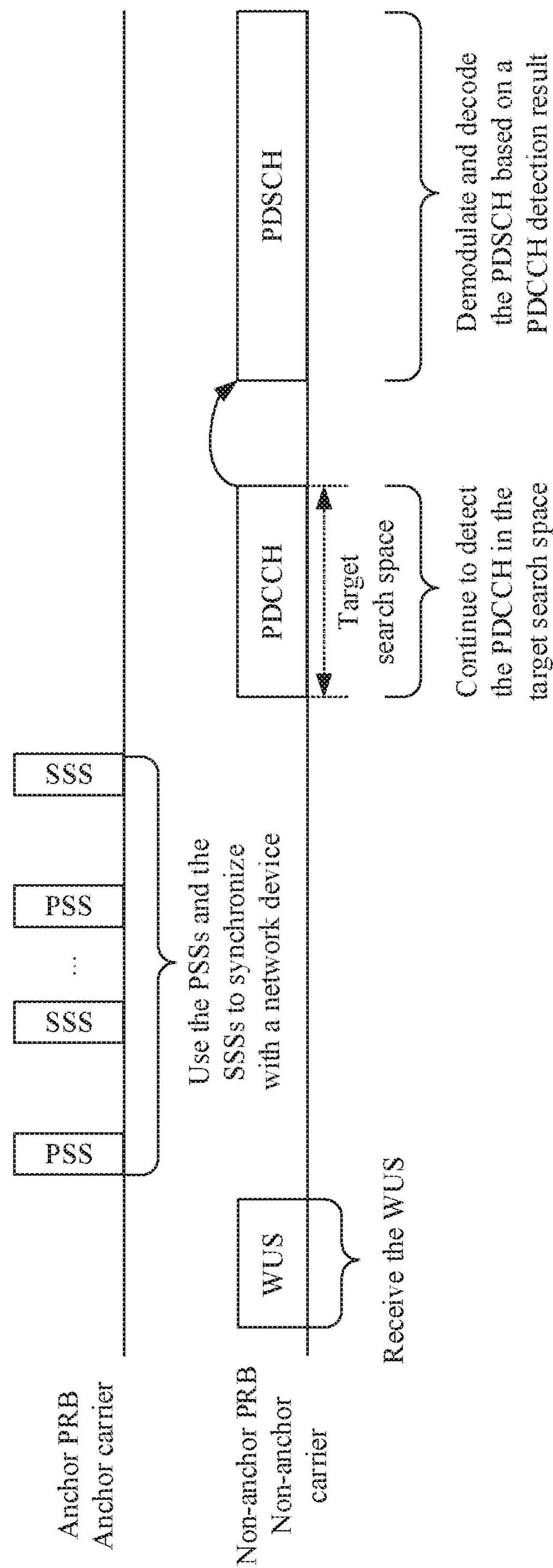
FIG. 7 is a schematic diagram 4 of detecting a PDCCH in a target search space by a terminal device based on an indication signal according to an embodiment of this application.

Specifically, the terminal device receives the WUS. If the terminal device receives the WUS, the terminal device first needs to synchronize with the network device, and then detects the PDCCH in the common search space starting from the PO, as shown in FIG. 7; or if the terminal device receives no WUS, the terminal device does not need to synchronize with the network device, and the terminal device does not need to continue to detect PDCCH in the common search space starting from the PO either, as shown in FIG. 6*b*.

It can be learned from the foregoing descriptions that differences among the procedure 1, the procedure 3, and the procedure 2 lie in: The WUS is not used to synchronize with the network device in both the procedure 1 and the procedure 3, and the WUS is used to synchronize with the network device in the procedure 2; in the procedure 2 and the procedure 3, pre-synchronization is not required before the WUS is detected, but in the procedure 1, pre-synchronization is required before the WUS is detected. A difference between the procedure 1 and the procedure 3 lies in: Synchronization is first performed with the network device and then the WUS is received in the procedure 1, while the WUS is first received and then synchronization is performed with the network device in the procedure 3.

For example, it is assumed that user equipment (UE) determines that a carrier on which the UE operates is the first carrier, that the UE is in an idle mode, that the UE wakes up at a time location with a DRX cycle used as a cycle, that the first configuration information indicates the first determining threshold (corresponding to Manner 1) or the third configuration information indicates the ninth determining threshold (corresponding to Manner 4), and that the first determining threshold=the ninth determining threshold=A.

If the UE determines that a measured RSRP 1<A, the UE directly detects the PDCCH in the common search space starting from the PO, and does not receive or process the WUS.

If the UE determines that a measured RSRP 1≥A, when the UE receives the WUS or indication information carried in the WUS instructs the UE to continue to process the subsequent associated PDCCH and PDSCH, the UE detects the PDCCH in the common search space starting from the PO; or if the UE receives no WUS or indication information carried in the WUS instructs the UE to skip continuing to process the subsequent associated PDCCH and PDSCH, the UE does not detect the PDCCH in the common search space starting from the PO.

For another example, it is assumed that a carrier that is determined by UE and on which the UE operates or on which the UE camps is the first carrier, that the UE is in an idle mode, that the UE wakes up at a time location with a DRX cycle used as a cycle, that the first configuration information indicates the third determining threshold (corresponding to Manner 2) or the fourth configuration information indicates the tenth determining threshold (corresponding to Manner 5), and that the third determining threshold=the tenth determining threshold=B.

If the UE determines that a measured RSRP 1<B, the UE performs the foregoing procedure 1. To be specific, before receiving the WUS, the UE first synchronizes with the network device. If receiving the WUS, the UE continues to detect the PDCCH in the common search space starting from the PO. If receiving no WUS, the UE does not detect the PDCCH in the common search space starting from the PO. Alternatively, the UE performs the foregoing procedure 3. If receiving the WUS, the UE synchronizes with the network device after receiving the WUS, and continues to detect the PDCCH in the common search space starting from the PO. If receiving no WUS, the UE does not detect the PDCCH in the common search space starting from the PO.

If the UE determines that a measured RSRP 1≥B, the UE performs the foregoing procedure 2. To be specific, if the UE receives the WUS or indication information carried in the WUS instructs the UE to continue to process the subsequent associated PDCCH and PDSCH, and the UE may simultaneously implement time-frequency synchronization with the network device, the UE continues to detect the PDCCH in the common search space starting from the PO; or if the UE receives no WUS or indication information carried in the WUS instructs the UE to skip continuing to process the subsequent associated PDCCH and PDSCH, the UE does not detect the PDCCH in the common search space starting from the PO.

For another example, it is assumed that a carrier that is determined by UE and on which the UE operates or on which the UE camps is the first carrier, that the UE is in an idle mode, that the UE wakes up at a time location with a DRX cycle used as a cycle, that the first configuration information indicates the fifth determining threshold and the sixth determining threshold (corresponding to Manner 3) or the fifth configuration information indicates the eleventh determining threshold and the twelfth determining threshold (corresponding to Manner 6), that the fifth determining threshold=the eleventh determining threshold=A, and that the sixth determining threshold=the twelfth determining threshold=B.

If the UE determines that a measured RSRP 1<A, the UE directly detects the PDCCH in the common search space starting from the PO, and does not receive the WUS.

If the UE determines that A≤RSRP 1<B, the UE performs the foregoing procedure 1. To be specific, before receiving the WUS, the UE first synchronizes with the network device. If receiving the WUS, the UE continues to detect the PDCCH in the common search space starting from the PO. If receiving no WUS, the UE does not detect the PDCCH in the common search space starting from the PO. Alternatively, the UE performs the foregoing procedure 3. If receiving the WUS, the UE synchronizes with the network device after receiving the WUS, and continues to detect the PDCCH in the common search space starting from the PO. If receiving no WUS, the UE does not detect the PDCCH in the common search space starting from the PO.

If the UE determines that a measured RSRP 1≥B, the UE performs the foregoing procedure 2. To be specific, if the UE receives the WUS and the UE may also implement time-frequency synchronization with the network device, the UE continues to detect the PDCCH in the common search space starting from the PO; or if the UE receives no WUS, the UE does not detect the PDCCH in the common search space starting from the PO.

The solutions provided in this application are described above mainly from a perspective of interaction between network elements. It may be understood that, the network elements include corresponding hardware structures and/or software modules for performing the foregoing functions. A person skilled in the art should be easily aware that, units and algorithm steps in the examples described with reference to the embodiments disclosed in this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 8:
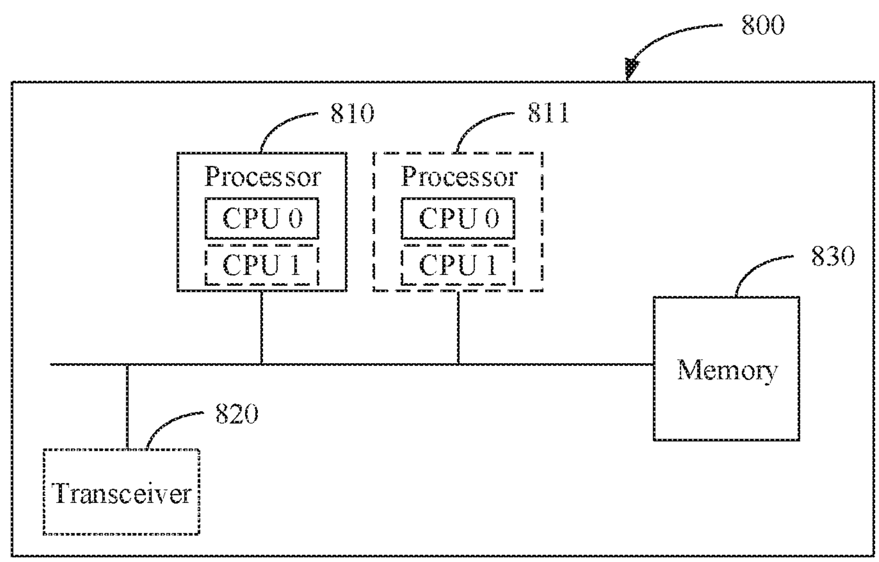
FIG. 8 is a schematic diagram of a communications apparatus according to an embodiment of this application.

Based on a same concept, FIG. 8 is a schematic diagram of a communications apparatus according to this application. The communications apparatus may be a network device, or may be a chip or a system-on-a-chip in a network device, and may perform the method performed by the network device in the embodiment shown in FIG. 3.

The communications apparatus 800 includes at least one processor 810 and a memory 830.

The memory 830 is configured to store a program, and may be a ROM, another type of static storage device that can store static information and an instruction, for example, a RAM, or another type of dynamic storage device that can store information and an instruction, or may be an electrically erasable programmable read-only memory (EEPROM), a compact disc read-only memory (CD-ROM) or another optical disc storage, an optical disc storage (including a compressed optical disc, a laser disc, an optical disc, a digital versatile optical disc, a Blu-ray disc, or the like), a disk storage medium or another magnetic storage device, or any other medium that can carry or store an expected program in a form of an instruction or a data structure and that can be accessed by a computer, but is not limited thereto. The memory 830 may exist independently, and is connected to the processor 810. The memory 830 may be alternatively integrated with the processor 810.

The processor 810 is configured to execute the program in the memory 830, to implement the steps performed by the network device in the indication signal configuration method in the embodiments of this application. For related features, refer to the foregoing descriptions. Details are not described herein again. The processor 810 may be a general-purpose CPU, a microprocessor, a specific ASIC, or one or more integrated circuits configured to control program execution of the solutions of this application.

In specific implementation, in an embodiment, the processor 810 may include one or more CPUs, for example, a CPU 0 and a CPU 1 in FIG. 8.

In specific implementation, in an embodiment, the apparatus 800 may include a plurality of processors, for example, the processor 810 and a processor 811 in FIG. 8. Each of the processors may be a single-core (single-CPU) processor, or may be a multi-core (multi-CPU) processor. Herein, the processor may be one or more devices, circuits, and/or processing cores for processing data (for example, a computer program instruction).

Optionally, when the communications apparatus 800 is a network device, the communications apparatus 800 may further include a transceiver 820 shown in FIG. 8, where the transceiver 820 is configured to communicate with another device or a communications network. The transceiver 820 includes a radio frequency circuit. In the network device, the processor 810, the transceiver 820, and the memory 830 may be connected by using a communications bus. The communications bus may include a path for transmitting information between the foregoing units. When the communications apparatus 800 is a chip or a system-on-a-chip in the network device, the processor 810 may send or receive data by using an input/output interface, a pin, a circuit, or the like.

Figure 9:
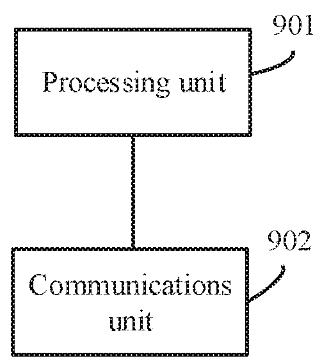
FIG. 9 is a schematic diagram of a communications apparatus according to an embodiment of this application.

FIG. 9 is a schematic diagram of another communications apparatus according to an embodiment of this application. The apparatus may be a network device, or may be a chip or a system-on-a-chip in a network device, and may perform the method performed by the network device in the embodiment shown in FIG. 3.

The apparatus includes a processing unit 901 and a communications unit 902.

The communications unit 902 is configured to: send first configuration information and second configuration information, send a first indication signal on a first carrier, and send a second indication signal on a second carrier, where the first configuration information is used to indicate duration of the first indication signal corresponding to the first carrier, the second configuration information is used to indicate duration of the second indication signal corresponding to the second carrier, the first indication signal is used to indicate whether a first terminal device continues to receive a signal associated with the first indication signal or process a channel associated with the first indication signal, the second indication information is used to indicate whether a second terminal device continues to receive a signal associated with the second indication signal or process a channel associated with the second indication signal, the first terminal device is a terminal device that needs to receive the first indication signal, and the second terminal device is a terminal device that needs to receive the second indication signal. Optionally, the first configuration information and the second configuration information are generated by the processing unit 901.

Optionally, the duration of the first indication signal is different from the duration of the second indication signal.

Optionally, the first carrier is an anchor carrier, and the second carrier is a non-anchor carrier.

Optionally, the first configuration information further indicates a first determining threshold, and the first determining threshold is used to instruct the first terminal device to determine whether to receive the first indication signal on the first carrier; and the second configuration information further indicates a second determining threshold, and the second determining threshold is used to instruct the second terminal device to determine whether to receive the second indication signal on the second carrier.

Optionally, the first configuration information further indicates a third determining threshold, and the second configuration information further indicates a fourth determining threshold. The third determining threshold is used to instruct the first terminal device to determine, in case of receiving the first indication signal on the first carrier, whether to use a synchronization signal to synchronize with the network device. The fourth determining threshold is used to instruct the second terminal device to determine, in case of receiving the second indication signal on the second carrier, whether to use the synchronization signal to synchronize with the network device.

Optionally, the first configuration information further indicates a fifth determining threshold and a sixth determining threshold, and the fifth determining threshold is less than the sixth determining threshold. The second configuration information further indicates a seventh determining threshold and an eighth determining threshold, and the seventh determining threshold is less than the eighth determining threshold. The fifth determining threshold and the sixth determining threshold are used to instruct the first terminal device to determine whether to receive the first indication signal on the first carrier, and determine, in case of receiving the first indication signal on the first carrier, whether to use a synchronization signal to synchronize with the network device. The seventh determining threshold and the eighth determining threshold are used to instruct the second terminal device to determine whether to receive the second indication signal on the second carrier, and determine, in case of receiving the second indication signal on the second carrier, whether to use the synchronization signal to synchronize with the network device.

Optionally, the communications unit 902 is further configured to send third configuration information, where the third configuration information indicates a ninth determining threshold. The ninth determining threshold is used to instruct the first terminal device to determine whether to receive the first indication signal on the first carrier, and is used to instruct the second terminal device to determine whether to receive the second indication signal on the second carrier.

Optionally, the communications unit 902 is further configured to send fourth configuration information, where the fourth configuration information indicates a tenth determining threshold. The tenth determining threshold is used to instruct the first terminal device to determine, in case of receiving the first indication signal on the first carrier, whether to use a synchronization signal to synchronize with the network device; and is used to instruct the second terminal device to determine, in case of receiving the second indication signal on the second carrier, whether to use the synchronization signal to synchronize with the network device.

Optionally, the communications unit 902 is further configured to send fifth configuration information, where the fifth configuration information indicates an eleventh determining threshold and a twelfth determining threshold, and the eleventh determining threshold is less than the twelfth determining threshold. The eleventh determining threshold and the twelfth determining threshold are used to instruct the first terminal device to determine whether to receive the first indication signal on the first carrier, and determine, in case of receiving the first indication signal on the first carrier, whether to use a synchronization signal to synchronize with the network device; and are used to instruct the second terminal device to determine whether to receive the second indication signal on the second carrier, and determine, in case of receiving the second indication signal on the second carrier, whether to use the synchronization signal to synchronize with the network device.

It should be understood that the communications apparatus may be configured to implement steps performed by the network device in the indication signal configuration method in the embodiments of this application. For related features, refer to the foregoing descriptions. Details are not described herein again.

Figure 10:
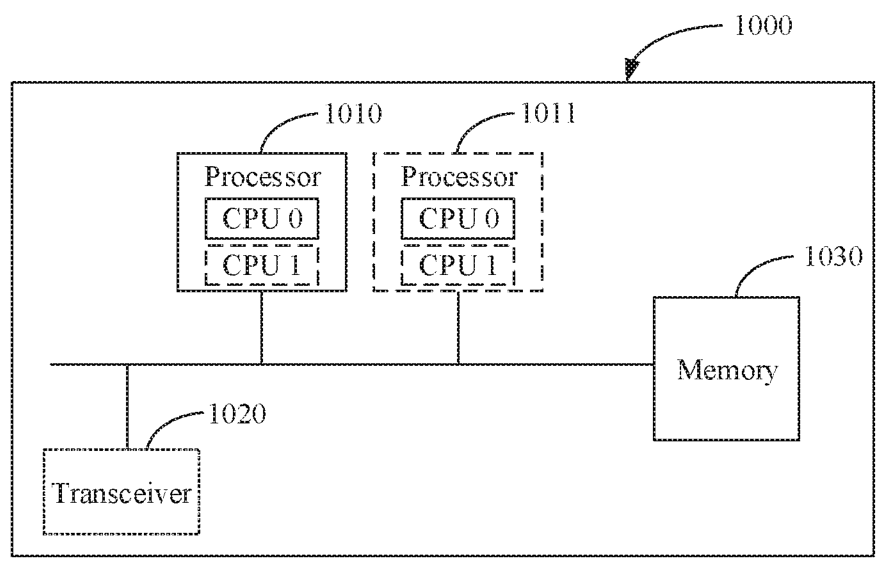
FIG. 10 is a schematic diagram of a communications apparatus according to an embodiment of this application.

Based on a same concept, FIG. 10 is a schematic diagram of a communications apparatus according to this application. The communications apparatus may be, for example, a terminal device or a chip or a system-on-a-chip in a terminal device, and may perform the method performed by the terminal device in the embodiment shown in FIG. 3.

The communications apparatus 1000 includes at least one processor 1010 and a memory 1030.

The memory 1030 is configured to store a program, and may be a ROM, another type of static storage device that can store static information and an instruction, for example, a RAM, or another type of dynamic storage device that can store information and an instruction, or may be an EEPROM, a CD-ROM or another optical disc storage, an optical disc storage (including a compressed optical disc, a laser disc, an optical disc, a digital versatile optical disc, a Blu-ray disc, or the like), a disk storage medium or another magnetic storage device, or any other medium that can carry or store an expected program in a form of an instruction or a data structure and that can be accessed by a computer, but is not limited thereto. The memory 1030 may exist independently, and is connected to the processor 1010. The memory **103*o* may be alternatively integrated with the processor 1010**.

The processor 1010 is configured to execute the program in the memory 1030, to implement the steps performed by the terminal device in the indication signal configuration method in the embodiments of this application. For related features, refer to the foregoing descriptions. Details are not described herein again. The processor 1010 may be a general-purpose CPU, a microprocessor, a specific ASIC, or one or more integrated circuits configured to control program execution of the solutions of this application.

In specific implementation, in an embodiment, the processor 1010 may include one or more CPUs, for example, a CPU 0 and a CPU 1 in FIG. 10.

In specific implementation, in an embodiment, the apparatus 1000 may include a plurality of processors, for example, the processor 1010 and a processor 1011 in FIG. 10. Each of the processors may be a single-core (single-CPU) processor, or may be a multi-core (multi-CPU) processor. Herein, the processor may be one or more devices, circuits, and/or processing cores for processing data (for example, a computer program instruction).

Optionally, when the communications apparatus 1000 is a network device, the communications apparatus 1000 may further include a transceiver 1020 shown in FIG. 10, where the transceiver 1020 is configured to communicate with another device or a communications network. The transceiver 1020 includes a radio frequency circuit. In the terminal device, the processor 1010, the transceiver 1020, and the memory **103*o* may be connected by using a communications bus. The communications bus may include a path for transmitting information between the foregoing units. When the apparatus 1000 is a chip or a system-on-a-chip in the terminal device, the processor 1010** may send or receive data by using an input/output interface, a pin, a circuit, or the like.

Figure 11:
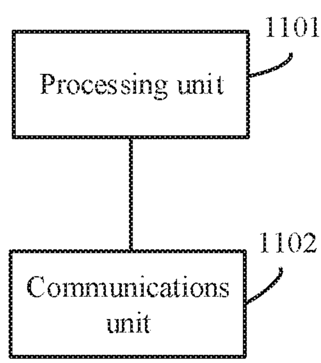
FIG. 11 is a schematic diagram of a communications apparatus according to an embodiment of this application.

FIG. 11 is a schematic diagram of another communications apparatus according to an embodiment of this application. The communications apparatus may be a terminal device, or may be a chip or a system-on-a-chip in a terminal device, and may perform the method performed by the first terminal device in the embodiment shown in FIG. 3.

The communications apparatus includes a processing unit 1101 and a communications unit 1102.

The communications unit 1102 is configured to: receive first configuration information sent by a network device, and receive a first indication signal on a first carrier. Then, the communications unit 1102 is further configured to continue to receive a signal associated with the first indication signal or process a channel associated with the first indication signal, or skip continuing to receive a signal associated with the first indication signal or process a channel associated with the first indication signal. The first configuration information is used to indicate duration of the first indication signal sent on the first carrier. The duration of the first indication signal is independent of duration of a second indication signal received by a second terminal device on a second carrier. The first indication signal is used to indicate whether a first terminal device continues to receive the signal associated with the first indication signal or process the channel associated with the first indication signal. The second indication information is used to indicate whether the second terminal device continues to receive a signal associated with the second indication signal or process a channel associated with the second indication signal. Optionally, the processing unit 1101 is configured to trigger the communications unit 1102.

Optionally, the duration of the first indication signal is different from the duration of the second indication signal.

Optionally, the first configuration information further indicates a first determining threshold. The processing unit 1101 is configured to determine that a measurement value of a preset parameter is greater than or equal to a first determining threshold, and the first terminal device receives the first indication signal on the first carrier.

Optionally, the first configuration information further indicates a third determining threshold. If the processing unit 1101 determines that a measurement value of a preset parameter is less than the third determining threshold, the communications unit 1102 is further configured to receive the first indication signal on the first carrier, and use a synchronization signal to synchronize with the network device. If the processing unit 1101 determines that a measurement value of a preset parameter is greater than or equal to the third determining threshold, the communications unit 1102 is further configured to receive the first indication signal on the first carrier, and use the first indication signal to synchronize with the network device.

Optionally, the first configuration information further indicates a fifth determining threshold and a sixth determining threshold, and the fifth determining threshold is less than the sixth determining threshold. If the processing unit 1101 determines that a measurement value of a preset parameter is greater than or equal to the fifth determining threshold and less than the sixth determining threshold, the communications unit 1102 is further configured to receive the first indication signal on the first carrier, and use a synchronization signal to synchronize with the network device. If the processing unit 1101 determines that a measurement value of a preset parameter is greater than or equal to the sixth determining threshold, the communications unit 1102 is further configured to receive the first indication signal on the first carrier, and use the first indication signal to synchronize with the network device.

Optionally, the communications unit 1102 is further configured to receive a reference signal on an anchor carrier, where the anchor carrier is the first carrier or another carrier; and the processing unit determines a reference signal received power (RSRP) corresponding to the reference signal as the measurement value of the preset parameter.

It should be understood that the communications apparatus may be configured to implement steps performed by the first terminal device in the indication signal configuration method in the embodiments of this application. For related features, refer to the foregoing descriptions. Details are not described herein again.

It should be understood that division of the communications apparatuses shown in FIG. 9 and FIG. 11 into modules is an example, and is merely logical function division. In actual implementation, there may be another division manner. For example, the communications unit is divided into a receiving unit, a sending unit, and the like.

Figure 12:
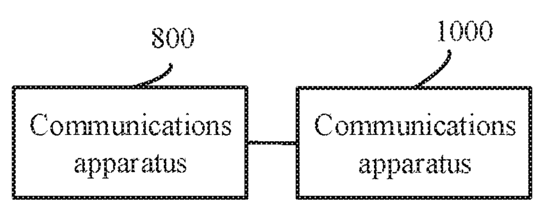
FIG. 12 is a schematic diagram of a communications system according to an embodiment of this application.

As shown in FIG. 12, an embodiment of this application further provides a communications system. The communications system includes a communications apparatus 800 and a communications apparatus 1000.

All or some of the foregoing embodiments may be implemented by using software, hardware, firmware, or any combination thereof in the foregoing embodiments. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of a plurality. A single processor or another unit may implement several functions listed in the claims. Some measures are described in dependent claims that are different from each other, but this does not mean that these measures cannot be combined to produce a better effect.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by the computer or the processor of the any other programmable data processing device generate an apparatus for implementing a specific function in one or more processes in the flowcharts and/or in one or more blocks in the block diagrams.

These computer program instructions may be stored in a computer-readable memory that can instruct the computer or the any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the any other programmable data processing device, so that a series of operations and steps are performed on the computer or the any other programmable device, thereby generating computer-implemented processing. Therefore, the instructions executed on the computer or the any other programmable device provide steps for implementing a specific function in one or more processes in the flowcharts and/or in one or more blocks in the block diagrams.

The objectives, technical solutions, and beneficial effects of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions of this application shall fall within the protection scope of this application.

What is claimed is:

1. A method comprising:

sending, by a network device, first configuration information and second configuration information, wherein the first configuration information indicates a first duration of a first indication signal corresponding to a first carrier, the second configuration information indicates a second duration of a second indication signal corresponding to a second carrier, the first indication signal instructs a first terminal device to continue to receive a signal or process a channel associated with the first indication signal or to skip continuing to receive the signal or process the channel associated with the first indication signal, the second indication signal instructs a second terminal device to continue to receive a signal or process a channel associated with the second indication signal or to skip continuing to receive the signal or process the channel associated with the second indication signal, the first duration of the first indication signal is different from the second duration of the second indication signal, the first indication signal is destined for the first terminal device, and the second indication signal is destined for the second terminal device; and sending, by the network device, the first indication signal on the first carrier, and sending the second indication signal on the second carrier; and wherein the first indication signal is sent in a first actual sending duration that is shorter than the first duration of the first indication signal, and the second indication signal is sent in a second actual sending duration that is shorter than the second duration of the second indication signal.

2. The method according to claim 1, wherein the first carrier is an anchor carrier, and the second carrier is a non-anchor carrier.

3. The method according claim 1, wherein the first indication signal is a first wakeup signal (WUS) and the second indication signal is a second WUS.

4. The method according to claim 1, wherein the channel associated with the first indication signal is a first physical downlink control channel (PDCCH) and the channel associated with the second indication signal is a second PDCCH.

5. A method comprising:

receiving, by a first terminal device, first configuration information from a network device, wherein the first configuration information indicates a first duration of a first indication signal sent on a first carrier, the first duration of the first indication signal is independent of a second duration of a second indication signal received from the network device on a second carrier, the first indication signal indicates whether the first terminal device is instructed to continue to receive a signal or process a channel associated with the first indication signal or to skip continuing to receive the signal or process the channel associated with the first indication signal, and the second indication signal indicates whether a second terminal device is instructed to continue to receive a signal or process a channel associated with the second indication signal or to skip continuing to receive the signal or process the channel associated with the second indication signal, the first duration of the first indication signal is different from the second duration of the second indication signal;

receiving, by the first terminal device, the first indication signal on the first carrier; and continuing, by the first terminal device based on the first indication signal, to receive the signal associated with the first indication signal or process the channel associated with the first indication signal, or skipping, by the first terminal device based on the first indication signal, continuing to receive the signal associated with the first indication signal or process the channel associated with the first indication signal; and wherein the first indication signal is sent in a first actual sending duration that is shorter than the first duration of the first indication signal, and the second indication signal is sent in a second actual sending duration of the second indication signal that is shorter than the second duration of the second indication signal.

6. The method according to claim 5, wherein the first configuration information further indicates a first determining threshold; and wherein receiving, by the first terminal device, the first indication signal on the first carrier comprises:

when the first terminal device determines that a measurement value of a preset parameter is greater than or equal to the first determining threshold, receiving, by the first terminal device, the first indication signal on the first carrier.

7. The method according to claim 5, wherein the first configuration information further indicates a third determining threshold; and the method further comprises:

when the first terminal device determines that a measurement value of a preset parameter is less than the third determining threshold, receiving, by the first terminal device, the first indication signal on the first carrier, and using a synchronization signal to synchronize with the network device; or when the first terminal device determines that the measurement value of the preset parameter is greater than or equal to the third determining threshold, receiving, by the first terminal device, the first indication signal on the first carrier, and using the first indication signal to synchronize with the network device.

8. The method according to claim 5, further comprising:

receiving, by the first terminal device, a reference signal on an anchor carrier, wherein the anchor carrier is the first carrier or another carrier; and determining, by the first terminal device, a reference signal received power (RSRP) corresponding to the reference signal as a measurement value of a preset parameter.

9. An apparatus, comprising a processor, a memory, and a transceiver, wherein the memory is configured to store a program; and wherein the processor invokes the program stored in the memory to perform following operations by using the transceiver:

sending first configuration information and second configuration information, wherein the first configuration information indicates a first duration of a first indication signal corresponding to a first carrier, the second configuration information indicates a second duration of a second indication signal corresponding to a second carrier, the first indication signal instruct a first terminal device to continue to receive a signal or process a channel associated with the first indication signal or to skip continuing to receive the signal or process the channel associated with the first indication signal, the second indication signal instructs a second terminal device to continue to receive a signal or process a channel associated with the second indication signal or to skip continuing to receive the signal or process the channel associated with the second indication signal, the first duration of the first indication signal is different from the second duration of the second indication signal, the first indication signal is destined for the first terminal device, and the second indication signal is destined for the second terminal device; and sending the first indication signal on the first carrier, and sending the second indication signal on the second carrier; and wherein the first indication signal is sent in a first actual sending duration that is shorter than the first duration of the first indication signal, and the second indication signal is sent in a second actual sending duration that is shorter than the second duration of the second indication signal.

10. The apparatus according to claim 9, wherein the first carrier is an anchor carrier, and the second carrier is a non-anchor carrier.

11. The apparatus according to claim 9, wherein the first indication signal is a first wakeup signal (WUS) and the second indication signal is a second WUS.

12. The apparatus according to claim 9, wherein the channel associated with the first indication signal is a first physical downlink control channel (PDCCH) and the channel associated with the second indication signal is a second PDCCH.

13. An apparatus, comprising a processor, a memory, and a transceiver, wherein the memory is configured to store a program; and wherein the processor invokes the program stored in the memory to perform following operations by using the transceiver:

receiving first configuration information from a network device, wherein the first configuration information indicates a first duration of a first indication signal sent on a first carrier, the first duration of the first indication signal is independent of a second duration of a second indication signal received from the network device on a second carrier, the first indication signal indicates whether the apparatus is instructed to continue to receive a signal or process a channel associated with the first indication signal or to skip continuing to receive the signal or process the channel associated with the first indication signal, and the second indication signal indicates whether a second terminal device is instructed to continue to receive a signal or process a channel associated with the second indication signal or skip continuing to receive the signal or process the channel associated with the second indication signal, the first duration of the first indication signal is different from the second duration of the second indication signal;

receiving the first indication signal on the first carrier; and continuing, based on the first indication signal, to receive the signal associated with the first indication signal or process the channel associated with the first indication signal, or skipping, based on the first indication signal, continuing to receive the signal associated with the first indication signal or process the channel associated with the first indication signal; and wherein the first indication signal is sent in a first actual sending duration that is shorter than the first duration of the first indication signal, and the second indication signal is sent in a second actual sending duration that is shorter than the second duration of the second indication signal.

14. The apparatus according to claim 13, wherein the first indication signal is a first wakeup signal (WUS) and the second indication signal is a second WUS.

15. The apparatus according to claim 13, wherein the channel associated with the first indication signal is a first physical downlink control channel (PDCCH) and the channel associated with the second indication signal is a second PDCCH.

16. The apparatus according to claim 13, wherein the first configuration information further indicates a first determining threshold; and the processor is configured to determine that a measurement value of a preset parameter is greater than or equal to the first determining threshold, and based thereon, the processor receives the first indication signal on the first carrier by using the transceiver.

* * * * *